US012482953B2

(12) United States Patent
Smith et al.

(10) Patent No.: US 12,482,953 B2
(45) Date of Patent: Nov. 25, 2025

(54) ALIGNMENT AND CONSTRAINING DEVICES FOR MAINTAINING POSITIONAL OPTIMIZATIONS BETWEEN ANTENNA ARRAY COMPONENTS

(71) Applicant: Optisys, Inc., Salt Lake City, UT (US)

(72) Inventors: Robert Smith, Salt Lake City, UT (US); Davin Phillips, Salt Lake City, UT (US); Michael Hollenbeck, Salt Lake City, UT (US)

(73) Assignee: Optisys, Inc., Salt Lake City, UT (US)

( * ) Notice: Subject to any disclaimer, the term of this patent is extended or adjusted under 35 U.S.C. 154(b) by 251 days.

(21) Appl. No.: 18/331,147

(22) Filed: Jun. 7, 2023

(65) Prior Publication Data

US 2024/0014547 A1 Jan. 11, 2024

Related U.S. Application Data

(60) Provisional application No. 63/365,996, filed on Jun. 7, 2022.

(51) Int. Cl.
*H01Q 21/00* (2006.01)
*H01Q 1/12* (2006.01)
(Continued)

(52) U.S. Cl.
CPC ....... *H01Q 21/0087* (2013.01); *H01Q 1/1207* (2013.01); *H01Q 1/50* (2013.01);
(Continued)

(58) Field of Classification Search
CPC .... H01Q 21/0087; H01Q 1/1207; H01Q 1/50; H01Q 9/16; H01Q 13/0283; H01Q 21/24; H01Q 21/0006
See application file for complete search history.

(56) References Cited

U.S. PATENT DOCUMENTS 6,018,315 A 1/2000 Ince et al.
6,198,730 B1 3/2001 Hogberg et al.
(Continued)

FOREIGN PATENT DOCUMENTS

FR 3087954 A1 12/2021
WO WO 2017203568 A1 6/2018
WO WO 2023240164 A1 12/2023

OTHER PUBLICATIONS

Machine translation prepared on Dec. 28, 2021, by Google Patents for Publication No. WO 2017203568.
(Continued)

*Primary Examiner* — Dimary S Lopez Cruz
*Assistant Examiner* — Anna N Hamadyk
(74) *Attorney, Agent, or Firm* — TechLaw Ventures, PLLC; Terrence J. Edwards

(57) ABSTRACT

Dielectric inserts providing positional support for components of antenna arrays. A system includes a coaxial pin in electromagnetic communication with an antenna array, and a dielectric insert configured to provide positional support for the coaxial pin. The dielectric insert includes a shaft comprising a central hollow space defined by a wall, and further includes a plurality of fins attached to the shaft. The system is such that the dielectric insert forms an interference fit with one or more of the coaxial pin or the antenna array.

19 Claims, 23 Drawing Sheets

(51) Int. Cl.
*H01Q 1/50* (2006.01)
*H01Q 9/16* (2006.01)
*H01Q 13/02* (2006.01)
*H01Q 21/24* (2006.01)

(52) U.S. Cl.
CPC .......... *H01Q 9/16* (2013.01); *H01Q 13/0283* (2013.01); *H01Q 21/24* (2013.01)

(56) References Cited

U.S. PATENT DOCUMENTS

| | | | | |
|---|---|---|---|---|
| 7,106,268 | B1 | 9/2006 | Angelucci | |
| 7,193,578 | B1 * | 3/2007 | Harris | H01Q 13/085 343/786 |
| 9,253,925 | B1 | 2/2016 | Smith | |
| 9,960,495 | B1 | 5/2018 | Hollenbeck et al. | |
| 10,170,833 | B1 | 1/2019 | Hollenbeck et al. | |
| 10,468,773 | B2 | 11/2019 | Hollenbeck et al. | |
| 10,481,253 | B1 | 11/2019 | Hollenbeck et al. | |
| 10,680,341 | B1 | 6/2020 | Anderson et al. | |
| 2013/0005180 | A1 * | 1/2013 | Malloy | H01R 9/0524 29/874 |
| 2013/0157503 | A1 * | 6/2013 | Sykes | H01R 24/44 439/578 |
| 2017/0018836 | A1 | 1/2017 | Ito | |
| 2018/0366800 | A1 | 12/2018 | Sysouphat | |
| 2020/0076085 | A1 | 3/2020 | Kamo et al. | |
| 2020/0127358 | A1 | 4/2020 | Rijk et al. | |
| 2020/0161738 | A1 | 5/2020 | Rijk et al. | |
| 2020/0266510 | A1 | 8/2020 | Gomez et al. | |
| 2020/0335881 | A1 | 10/2020 | Le | |
| 2024/0170850 | A1 * | 5/2024 | Blennius | H01Q 9/045 |
| 2024/0258752 | A1 * | 8/2024 | MacManus | H01R 12/714 |

OTHER PUBLICATIONS

Machine translation prepared on Dec. 28, 2021, by Google Patents for Publication No. FR3087954A1.

Motomi Abe, et al., "Ka-Band Branch Line Coupler Applied Hexagonal Waveguide Suitable for Additive Manufacturing," IEICE Trans. Electron., vol. E101-C, NO.

Motomi Abe, et al., "A 3-D Metal-Direct-Printed, Low-Cost, and Light Hexagonal Waveguide Ka-Band Branch Line Coupler," Proceedings of the 47th European Microwave Conference, Oct. 2017, pp. 188-191, EuMA, Nuremberg Germany.

Zhang Kai, et al., "A Novel Design of Circularly Polarized Waveguide Antenna," 2014 3rd Asia-Pacific Conference on Antennas and Propagation, 2014, pp. 130-133, IEEE, Harbin, China.

James P. Becker, et al., "Toward a Novel Planar Circuit Compatible Silicon Micromachined Waveguide," Electrical Engineering and Computer Science, The University of Michigan, 1999, pp. 221-224, IEEE, Ann Arbor, Michigan.

N. Nathrath, et al. "Lightweight Intersatellitelink Antenna (LISA) operating at Ka-Band," Technical University of Munich, Institute of Astronautics, Munich, Germany, Published Apr. 12, 2010, Downloaded on Apr. 23, 2023 UTC from IEEE Xplore, 4 Pages.

English translation of WO2017203568 prepared by Google Patents (https://patents.google.com/patent/JPWO2017203568A1/en?oq=WO+2017203568).

English translation of FR3087954 prepared by Google Patents (https://patents.google.com/patent/FR3087954A1/en?oq=FR+3087954).

English translation of WO2023240164 (https://patents.google.com/patent/WO2023240164A2/en?oq=WO+202340164).

* cited by examiner

ALIGNMENT AND CONSTRAINING DEVICES FOR MAINTAINING POSITIONAL OPTIMIZATIONS BETWEEN ANTENNA ARRAY COMPONENTS

TECHNICAL FIELD

The disclosure relates generally to positional components and specifically to inserts for maintaining positional optimizations between antenna array components.

BACKGROUND

Antenna arrays consist of multiple antenna elements that are strategically arranged to achieve desired performance characteristics. The performance of an antenna array will typically suffer if certain antenna elements are not optimally positioned relative to one another.

Tightly coupled dipole antenna arrays are manufactured with intentional dimensional gaps between adjacent antenna dipole radiating elements, which refers to the spacing between adjacent antenna elements to produce an intended capacitive coupling, and may include optimized horizontal or vertical spacings. The optimization of dimensional gaps can significantly impact the performance of the antenna array. For example, the dimensional gaps can impact operational frequency bandwidth, beam steering, and active return loss levels of the antenna array.

Thus, accurate position control of dimensional gaps in an antenna array, especially one that relies on tight coupling between adjacent radiating elements, can be crucial to achieving optimal performance in antenna arrays. In traditional antenna arrays, these dimensional gaps can be compromised due to misalignment and deformation of antenna structures during assembly and handling, and further due to natural thermal, shock, and vibration conditions during operation. These issues become particularly challenging when fabricating complicated geometries such as an additively manufactured tightly coupled dipole radiating element structure. Control of dimensional gaps with bonded or form-in-place dielectric structures requires complex assembly that can increase cost of fabrication of antenna arrays. Traditional dielectrics used to constrain coaxial waveguide pins also add loss by being a solid cylinder of dielectric material.

What is needed are systems and devices to maintain dimensional gaps within an antenna array, minimize volume of dielectric material, and provide ease of assembly without required bonding or form-in-place methods. In view of the foregoing, described herein are systems, methods, and devices for maintaining optimized configurations within an antenna array.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood regarding the following description and accompanying drawings where.

DETAILED DESCRIPTION

Figure 1:
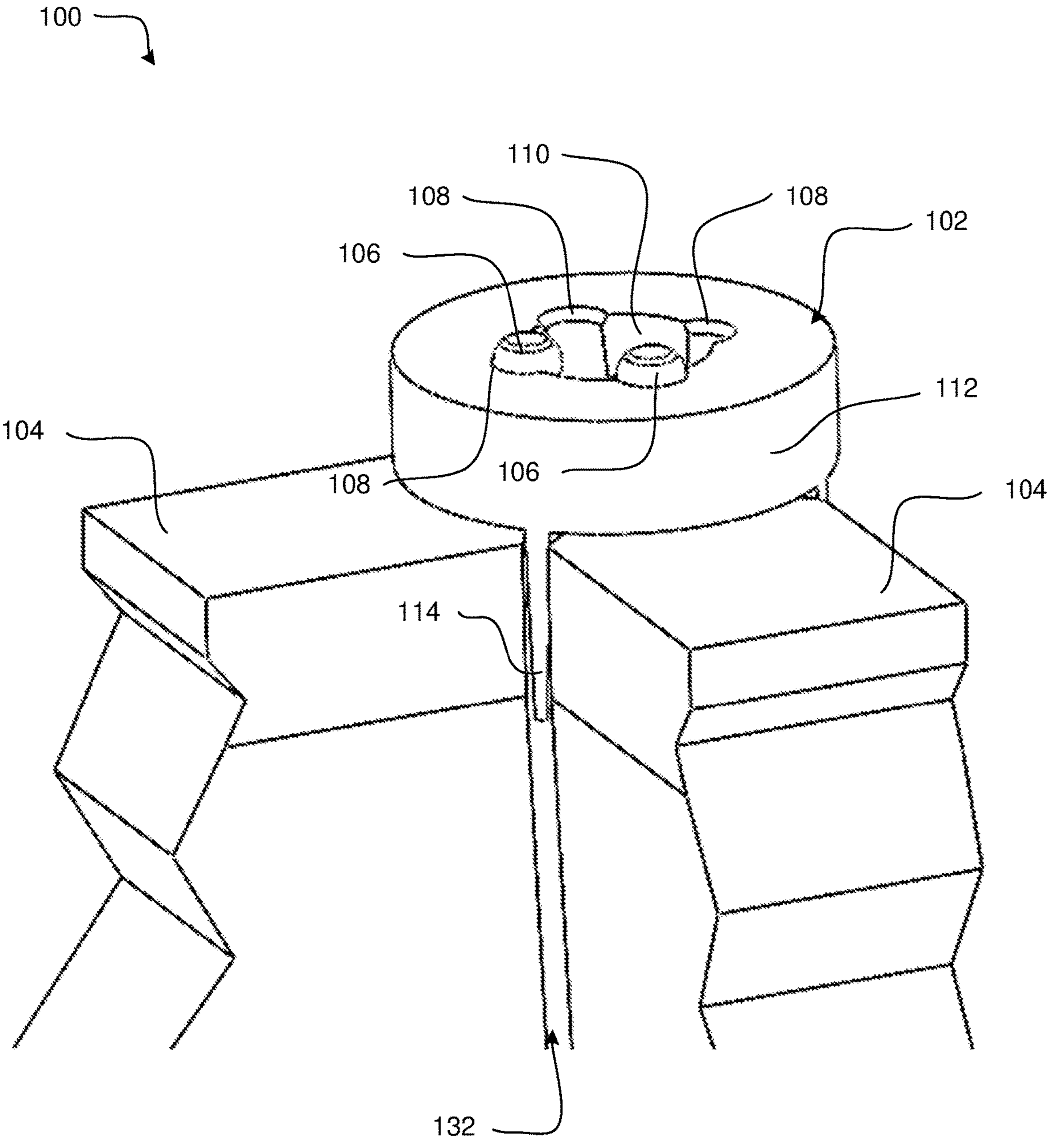
FIG. 1 illustrates a perspective view of a support system that includes an insert for maintaining positional optimizations between antenna array components.

Described herein are systems, methods, and devices for maintaining optimized physical configurations within an antenna array. Specifically described herein are dielectric supports that provide support and alignment to maintain capacitive spacing between radiating elements within an antenna array. Further described herein are systems, methods, and devices for dielectric supports that provide support and alignment for coaxial pins within an antenna array and minimize the volume of dielectric materials in the coaxial waveguide region.

The supports described herein may be installed and maintained within an antenna array by way of a press-fit and/or snap-fit fastening mechanism. The fastening mechanisms described herein reduce or eliminate the need to utilize additional adhesives. The supports described herein are manufactured of a dielectric material that has relatively constant permittivity and a low loss tangent over a wide bandwidth of operation within a subset of the range of 0.1 to 100 GHz, where a wide bandwidth may be 2:1, 5:1, or 10:1, for example. Good examples of materials with these characteristics are Teflon, Ultem, Delrin, ABS, and other similar materials. The supports are configured to be used in connection with an antenna array that is manufactured with a conductive material. The supports described herein are configured to be installed within an antenna array after the supports and the antenna array are separately manufactured.

In traditional antenna arrays, dielectric supports may be installed using adhesives, rather than relying only on press-fit and/or snap-fit fastening mechanisms as described herein. Use of adhesives rather than press-fit and/or snap-fit fastening mechanisms in traditional antenna arrays allows for simpler fabrication of the metallic radiating element. With additive manufacturing the complex press-fit and/or snap-fit features can be printed into the metallic radiating element directly. Further, in many antenna arrays, there are no dielectric supports installed to prevent the antenna components from shifting during manufacturing, install, transport, and operation. When the antenna components are bent or warped, the functionality of the antenna array suffers. The supports described herein address several issues known with traditional antenna array systems. Specifically, the supports described herein are configured to maintain optimized gaps between antenna components and are capable of being successfully installed and maintained without the use of additional adhesives.

The antenna components described herein are manufactured utilizing additive manufacturing (i.e., three-dimensional printing) processes. Embodiments of the antenna components may be manufactured with metal additive manufacturing in a conductive metal alloy like an Aluminum alloy. When utilizing additive manufacturing techniques to print tightly coupled dipoles, there are small gaps between antenna radiating elements and free-floating coaxial pins. Traditional practices provide no support to the location and accuracy of the gaps following additive manufacturing, and this is not ideal for manufacturability or resistance to shocks and vibrations. The dielectric supports described herein improve the ease of installation and the scalability of manufacturing, and additionally provide support to antenna radiating elements and coaxial pins.

In the following description, for purposes of explanation and not limitation, specific techniques and embodiments are set forth, such as particular techniques and configurations, to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to embodiments are not restricted to only those embodiments in which they are described. For example, an element described in reference to one embodiment or figure, may be alternatively included in another embodiment or figure regardless of whether those elements are shown or described in another embodiment or figure. In other words, elements in the figures may be interchangeable between various embodiments disclosed herein, whether shown or not.

Before the structure, systems, and methods for dielectric supports are disclosed and described, it is to be understood that this disclosure is not limited to the structures, configurations, process steps, and materials disclosed herein as such structures, configurations, process steps, and materials may vary somewhat. It is also to be understood that the terminology employed herein is used for the purpose of describing embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

For the purposes of this description as it relates to metal additive manufacturing, the direction of growth over time is called the positive z-axis, or "zenith" while the opposite direction is the negative z-axis or "nadir." The nadir direction is sometimes referred to as "downward" although the orientation of the z-axis relative to gravity makes no difference in the context of this invention. The direction of a surface at any given point is denoted by a vector that is normal to that surface at that point. The angle between that vector and the negative z-axis is the “overhang angle,” (“theta”).

The term “downward facing surface” is any non-vertical surface of an object being fabricated in a metal additive manufacturing process that has an overhang angle, θ, measured between two vectors originating from any single point on the surface. The two vectors are: (1) a vector perpendicular to the surface and pointing into the air volume and (2) a vector pointing in the nadir (negative z-axis, opposite of the build, or zenith) direction. An overhang angle, θ, for a downward facing surface will generally fall within the range: $0° \leq \theta < 90°$. Overhang angles, θ, for downward facing surfaces are illustrated in various embodiments of hollow metal waveguides, as further described below. As used herein, downward facing surfaces are unsupported by removable support structures from within a waveguide during fabrication, for example, which means that no internal bracing exists within a cavity of a waveguide for supporting downward facing surfaces or build walls.

Referring now to the figures, FIGS. 1-11 illustrate embodiments for press-fit or snap-fit support inserts for maintaining optimized gaps between radiating elements and other components of an antenna array. As described herein, press-fit inserts may be used on the upper end of an antenna array to maintain positioning of delicate antenna components. The press-fit upper inserts described herein may specifically be used for tightly coupled dipole arrays that are additively manufactured. These press-fit upper inserts aid in controlling the positioning of antenna elements and maintaining the gaps between antenna elements.

FIGS. 1-5 illustrate a first embodiment of a support system 100 that includes an upper insert 102 configured to be disposed within an antenna array. The antenna array comprises tightly coupled dipole elements that are spaced on a lattice in two axes, where the lattice spacing is less than one free space wavelength at the highest frequency of operation for the antenna array. In an ideal implementation, the lattice spacing is one-half the free space wavelength at the highest frequency of operation of the antenna array. A lattice spacing of one-half the free space wavelength at the highest frequency of operation allows for optimized electronic scanning performance without grating lobes.

FIG. 1 illustrates a perspective view of the support system 100 for an antenna array. The upper insert 102 of the support system 100 is specifically configured to maintain optimized spacing between radiating elements 104 of an antenna array. In the example illustrated in FIG. 1, two of four radiating elements 104 within a tightly coupled region are visible. The configuration of radiating elements 104 supports dual orthogonal polarization in the antenna array. Other embodiments of single polarization may include a total of two radiating elements 104 arranged in parallel in the tightly coupled region. The two radiating elements 104 shown are orthogonal to one another, and this enables dual orthogonal linear polarization in the tightly coupled dipole array. The remaining two radiating elements 104 (not visible in FIG. 1) may be identical in geometry or they may be different to the two radiating elements 104 visible in FIG. 1.

The antenna array may include one or more dipole radiating elements 104. In a tightly coupled dipole array, multiple radiating elements 104 are arranged in a particular geometric configuration such that there is a tightly coupled capacitive region between adjacent radiating elements 104 in the lattice. The dipole radiating elements 104 are typically fed with a coaxial waveguide which is connected to a phased array feed network to control the phase and amplitude of the signals applied to each dipole radiating element 104. By adjusting the relative phase and amplitude of the electromagnetic signals applied to each dipole radiating element 104, dipole antenna arrays can perform beamforming, which is the ability to steer the main lobe of the radiation pattern in a desired direction. Beamforming enables better control over the antenna array's coverage and allows for focusing the antenna's energy toward a specific target or nulling unwanted interference.

The antenna array may include pairs of dipole radiating elements 104 to form an orthogonal pair within a tightly coupled region. The orthogonal pair includes four radiating elements 104, two of which are driven and two are grounded when fed in an unbalanced configuration. The dielectric insert to control the gaps in the tightly coupled region could also be used to control gaps in the tightly coupled region of a balanced-fed orthogonal pair, where all four radiating elements 104 are driven. The upper inserts described herein may particularly be implemented to maintain the desired gaps or spacing between each radiating element 104 within an orthogonal pair arrangement. The upper inserts described herein are releasably fastened to the antenna array by way of a press-fit or snap-fit with one or more alignment horns 106 attached to the radiating elements 104. The alignment horns 106 aid in aligning and retaining the upper insert 102 within a quad of radiating elements 104.

The antenna array may include pairs of dipole radiating elements 104 to form an orthogonal pair. The orthogonal pair includes four radiating elements 104. The upper inserts described herein may particularly be implemented to maintain the desired gaps or spacing between each radiating element 104 within an orthogonal pair arrangement. The upper inserts described herein are releasably fastened to the antenna array by way of a press-fit or snap-fit with one or more alignment horns 106 attached to the radiating elements 104. The alignment horns 106 aid in aligning and retaining the upper insert 102 within a quad of radiating elements 104.

The upper insert 102 is manufactured separately from the antenna array and is later installed into the antenna array. The upper insert 102 provides structural support and electrical insulation within the antenna array. The upper insert 102 may additionally be utilized to modify the radiating characteristics of the radiating elements 104. The upper insert 102 may be manufactured using additive manufacturing, CNC machining, molding, or any other technique suitable for precision manufacturing of dielectric parts.

The upper insert 102 is manufactured separately from the antenna array and is later installed into the antenna array. The upper insert 102 provides structural support and electrical insulation within the antenna array. In some implementations, the upper insert 102 may be utilized to maintain and optimized negative airspace 132 within the antenna array. The upper insert 102 may additionally be utilized to modify the radiating characteristics of the radiating elements 104.

The upper insert 102 includes a stud 112 and one or more fins 114 attached to the stud 112. As shown in FIG. 1, the stud 112 protrudes beyond the surfaces of the radiating elements 104, and the fins 114 (only one fin 114 visible in FIG. 1) are disposed between walls formed by the radiating elements 104. Thus, the fins 114 are disposed interior to the antenna array relative to the stud 112.

The stud 112 includes one or more horn receptacles 108 formed into an interior space defined by the stud 112. The stud 112 may additionally include one or more support regions 110 disposed between two horn receptacles 108, as shown in FIG. 1. The implementation illustrated in FIG. 1 is intended for a quad array that includes four radiating elements 104. Thus, the stud 112 includes four horn receptacles 108 and four support regions 110 disposed between the horn receptacles 108. The interior space within the stud 112 thus alternates between a horn receptacle 108 and a support region 110. In this implementation, the stud 112 may be referred to as having an open interior space comprising the horn receptacles 108 and the support regions 110. In an alternative implementation (see, e.g., FIG. 3), the stud 112 does not have the open interior space, and instead includes only holes forming the horn receptacles 108.

Figure 2:
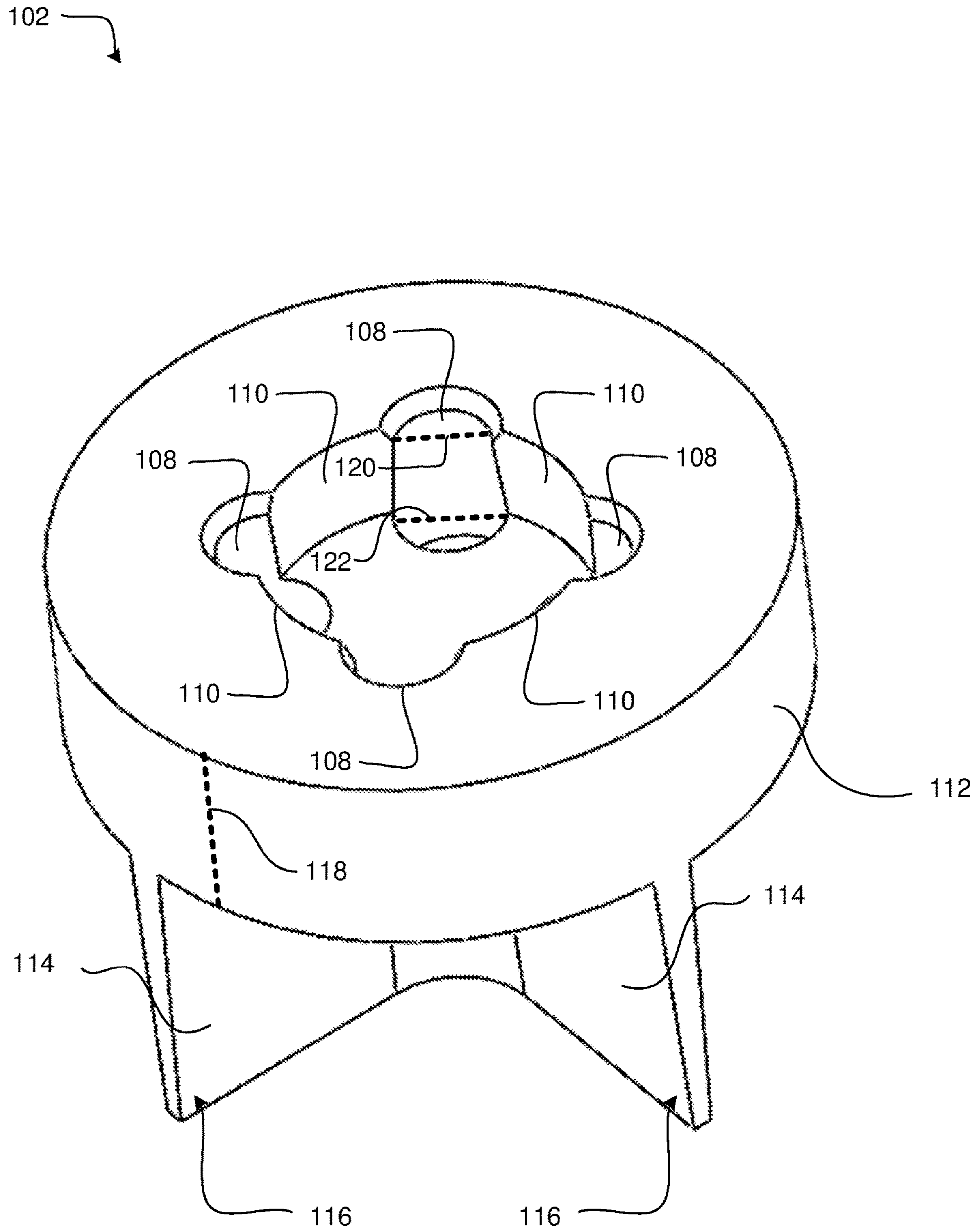
FIG. 2 illustrates a perspective view of an insert for maintaining positional optimizations between antenna array components.

FIG. 2 is a perspective view of the upper insert 102. As shown in FIG. 2, the open interior space of the stud 112 includes alternating horn receptacles 108 and support regions 110. Each of the horn receptacles 108 is configured to receive an alignment horn 106 of the antenna array and enable the alignment horn 106 to form a secure press-fit with the stud 112 of the upper insert 102.

Further as shown in FIG. 2, the fins 114 of the upper insert 102 may include a tapered geometry 116. The tapered geometry 116 is such that a proximal portion of the fin 114 (i.e., a portion nearest the stud 112) is wider or thicker than a distal portion of the fin. The tapered geometry 116 of the fins 114 may be optimized for easily sliding the upper insert 102 into the negative air space 132 between each radiating element 104. Additionally, the tapered geometry 116 of the fins 114 may be optimized for ease of manufacture with an injection molding process.

Figure 3:
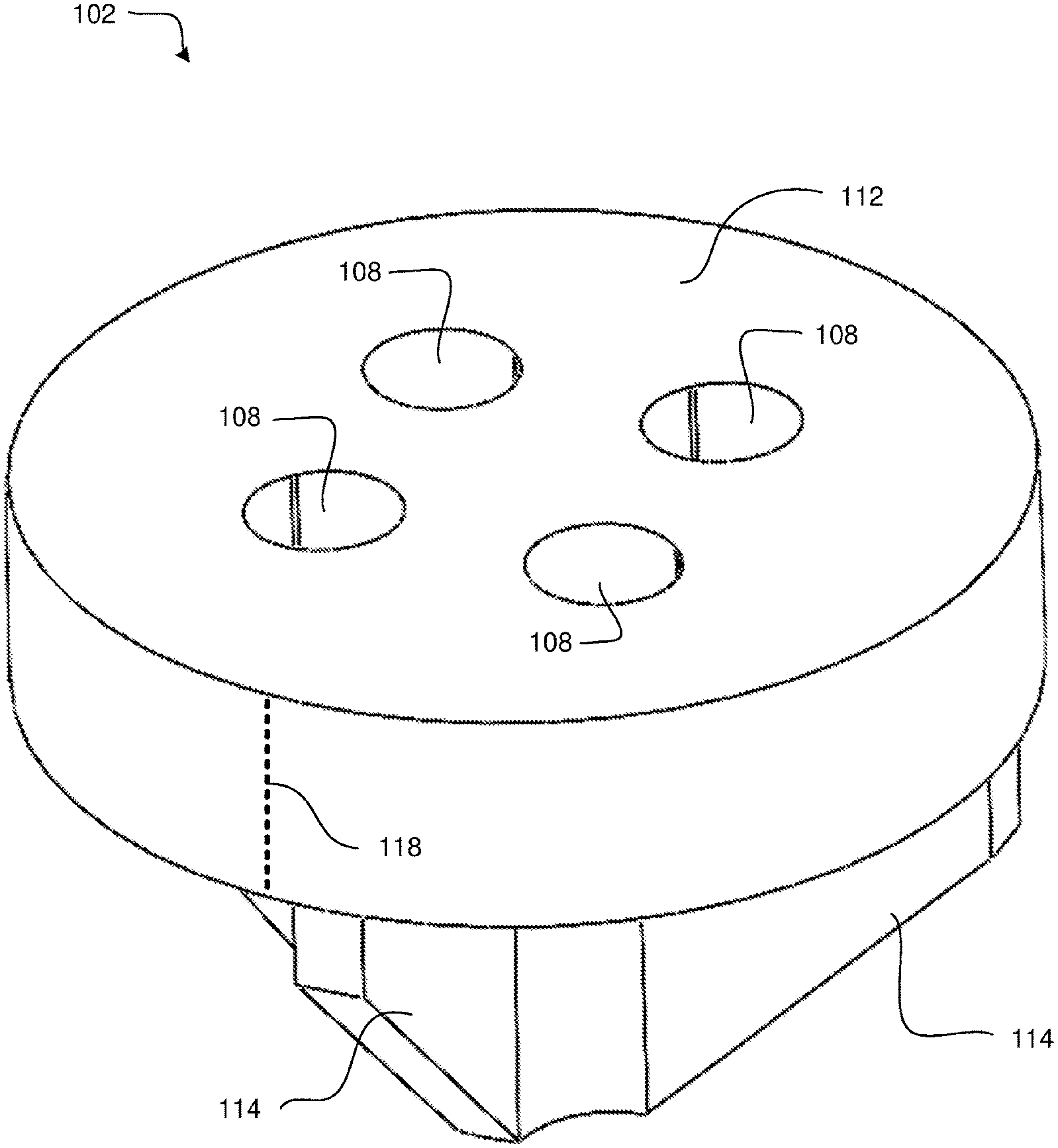
FIG. 3 illustrates a perspective view an insert for maintaining positional optimizations between antenna array components.

The stud 112 includes a stud width 118, which will be optimized and adjusted based on the particular configurations of the antenna array. As shown in FIGS. 2-3, the horn receptacles 108 comprise holes or indentations that extend through the stud width 118. The horn receptacles 108 provide a means for sliding the stud 112 around the one or more alignment horns of the antenna array.

The geometry of the horn receptacle 108 is optimized based on the geometry of the corresponding alignment horn 106. In some implementations, the alignment horns 106 include a shaft and a detent end attached to the shaft. The shaft may include a cylindrical geometry or a conical frustum geometry (i.e., a frustum of a cone having two planar bases oriented parallel to one another). If the alignment horn 106 has a cylindrical geometry, then the negative space defined by the horn receptacle 108 is configured with a corresponding cylindrical geometry to form a tight compression fit with the alignment horn 106. Alternatively, if the alignment horn 106 has a conical frustum geometry, then the negative space defined by the horn receptacle 108 is configured with a corresponding conical frustum geometry to form a tight compression fit with the alignment horn 106. Alternatively, the alignment horn 106 may be designed smaller than the horn receptacle 108 such that a slip fit is formed.

FIG. 2 illustrates wherein the horn receptacles 108 are configured with a conical frustum geometry. The conical frustum geometry includes a proximal diameter 122 and a distal diameter 120 (wherein the proximal and distal designations are measured relative to the radiating elements 104 of the antenna array). Typically, the distal diameter 120 is smaller than the proximal diameter 122 to match a corresponding geometry on the shaft of the alignment horn 106. However, it should be appreciated that in other implementations, the proximal diameter 122 may be shorter than the distal diameter 120.

FIG. 3 illustrates a perspective view of an embodiment of the upper insert 102 that does not include the "open interior space" discussed in connection with FIG. 2. In the embodiment illustrated in FIG. 3, the upper insert 102 includes the horn receptacles 108, which are holes disposed through the stud width 118 of the stud 112. In the embodiment illustrated in FIG. 3, the fins 114 are similarly attached to the stud 112. The embodiment illustrated in FIG. 3 may be configured to snap on to the antenna array when detent ends (see 128 first illustrated at FIG. 4) of the alignment horns 106 are pressed through the horn receptacles 108.

Figure 4:
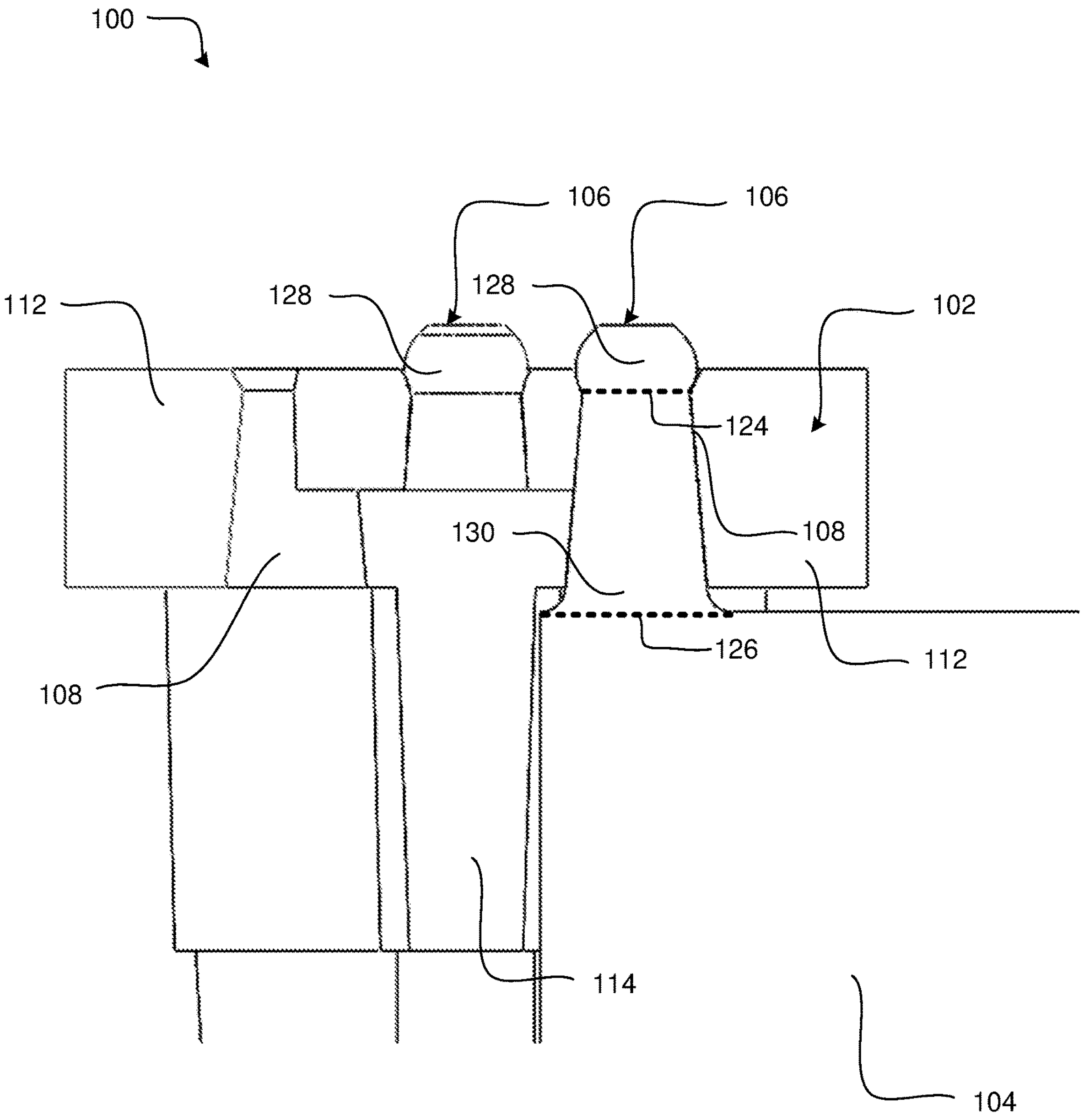
FIG. 4 illustrates a straight-on cross-sectional side view of a support system that includes an insert for maintaining positional optimizations between antenna array components.

FIG. 4 illustrates a straight-on cross-sectional side view of the support system 100 discussed in connection with FIGS. 1-3. The support system 100 includes the upper insert 102 disposed within the antenna array. As shown in the cross-sectional view in FIG. 4, the alignment horn 106 is disposed within the horn receptacle 108 formed in the stud 112 of the upper insert 102.

As shown in FIG. 4, the alignment horns 106 may include a shaft 130 and a detent end 128 attached to the shaft 130. In some implementations, the detent end 128 comprises an ellipsoidal segment geometry or a spherical segment geometry, as shown in FIG. 4. The ellipsoidal segment or spherical segment geometry of the detent end 128 causes the detent end 128 to have a flat bottom wherein the detent end 128 is attached to the shaft 130. The detent end 128 may optionally additionally have a flat top as shown in FIG. 4. In some implementations, the detent end 128 forms a ball shape attached to the distal end of the shaft 130. The detent end 128 prevents the upper insert 102 from shifting or sliding off the shaft 130. The detent end 128 comprises a width or diameter that is greater than a diameter of the horn receptacle 108, and thus prevents the stud 112 from sliding off the alignment horns 106.

The shaft 130 includes a proximal end that is attached to the radiating element 104, and a distal end that is attached to the detent end 128. The diameter of the detent end 128 is optimized such that the alignment horn 106 may be pressed through the horn receptacles 108 of the upper insert 102. Additionally, the diameter of the detent end 128 is further optimized to prevent the upper insert 102 from sliding off the alignment horn 106.

Further to the discussion presented in connection with FIG. 2 regarding the geometry of the horn receptacle 108, the shaft 130 of the alignment horn 106 may have a cylindrical or conical frustum geometry. The horn receptacles 108 and the alignment horns 106 will thus have corresponding geometries to ensure a tight compression fit between an alignment horn 106 and a horn receptacle 108. Alternatively, the alignment horn 106 may be designed smaller than the horn receptacle 108 such that a slip fit is formed. As shown in FIG. 4, the alignment horn 106 has a proximal diameter 126 and a distal diameter 124. In some cases, as shown in FIG. 4, the distal diameter 124 is shorter than the proximal diameter 126. However, it should be understood that in alternative implementations, the proximal diameter 126 may be shorter than the distal diameter 124. Typically, the diameter of the detent end 128 is longer than the distal diameter 124 of the shaft 130.

The alignment horns 106 may have a tapered or conical geometry as shown in FIG. 4. The horn receptacle 108 formed into the stud 112 has a corresponding tapered geometry. As shown in FIG. 4, the conical geometry of the alignment horn 106 corresponds with the tapered geometry of the horn receptacle 108 to improve the stability of the compression fit between the upper insert 102 and the antenna array.

Figure 5:
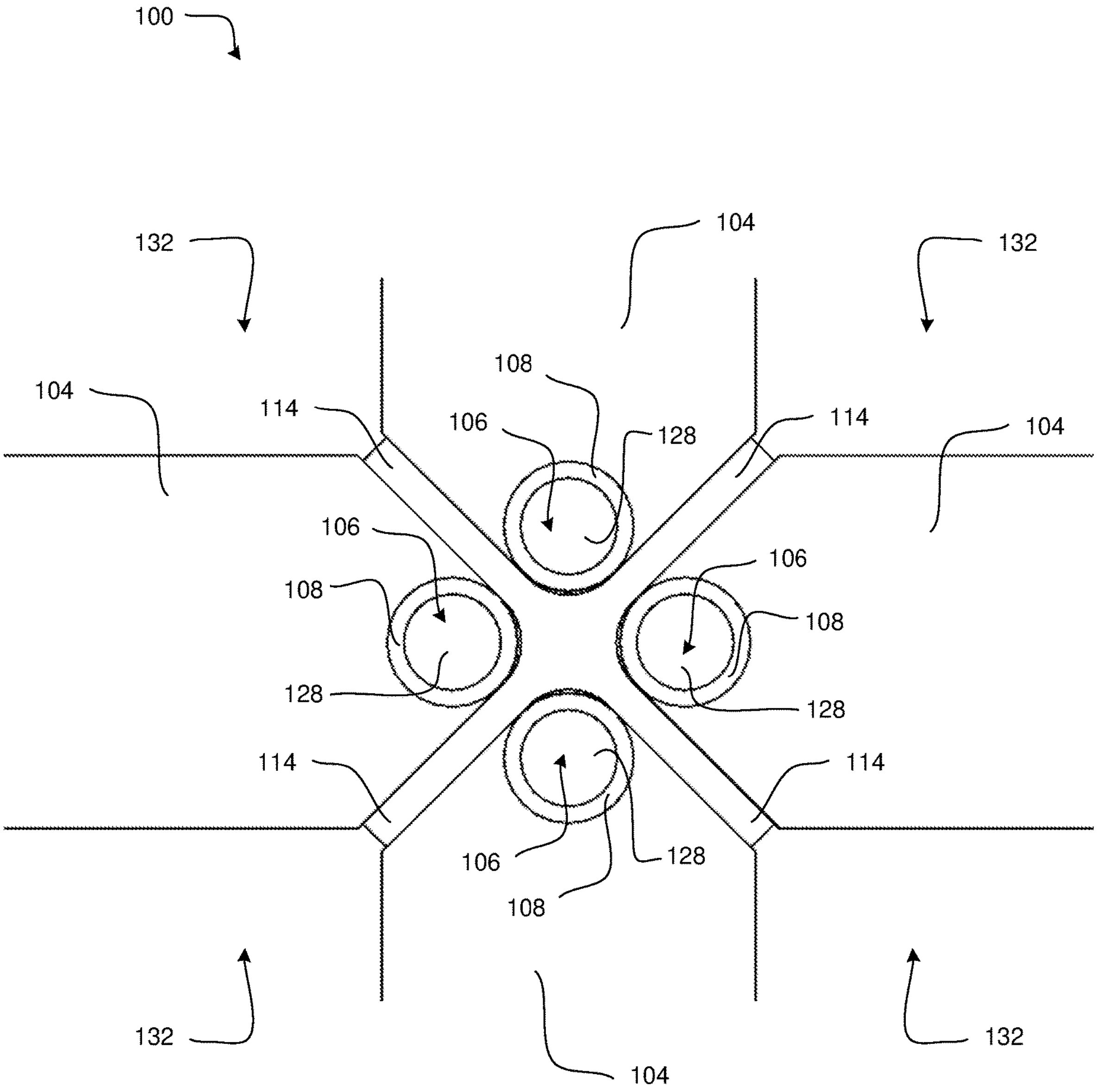
FIG. 5 illustrates a cross-sectional top-down aerial view of a support system that includes an insert for maintaining positional optimizations between antenna array components.

FIG. 5 illustrates a straight-on top-down aerial view of the support system 100, wherein the detent ends 128 of the alignment horns 106 are pressed through the horn receptacles 108 of the upper insert 102. FIG. 5 illustrates an embodiment wherein the antenna array includes four radiating elements 104 arranged in an orthogonal pair configuration. As shown, the fins 114 of the upper insert 102 disposed between pairs of radiating elements 104 to maintain the optimized gaps between the four radiating elements 104. The upper insert 102 additionally aids in maintaining the geometry of the negative airspace 132 disposed between the radiating elements 104.

Figure 6:
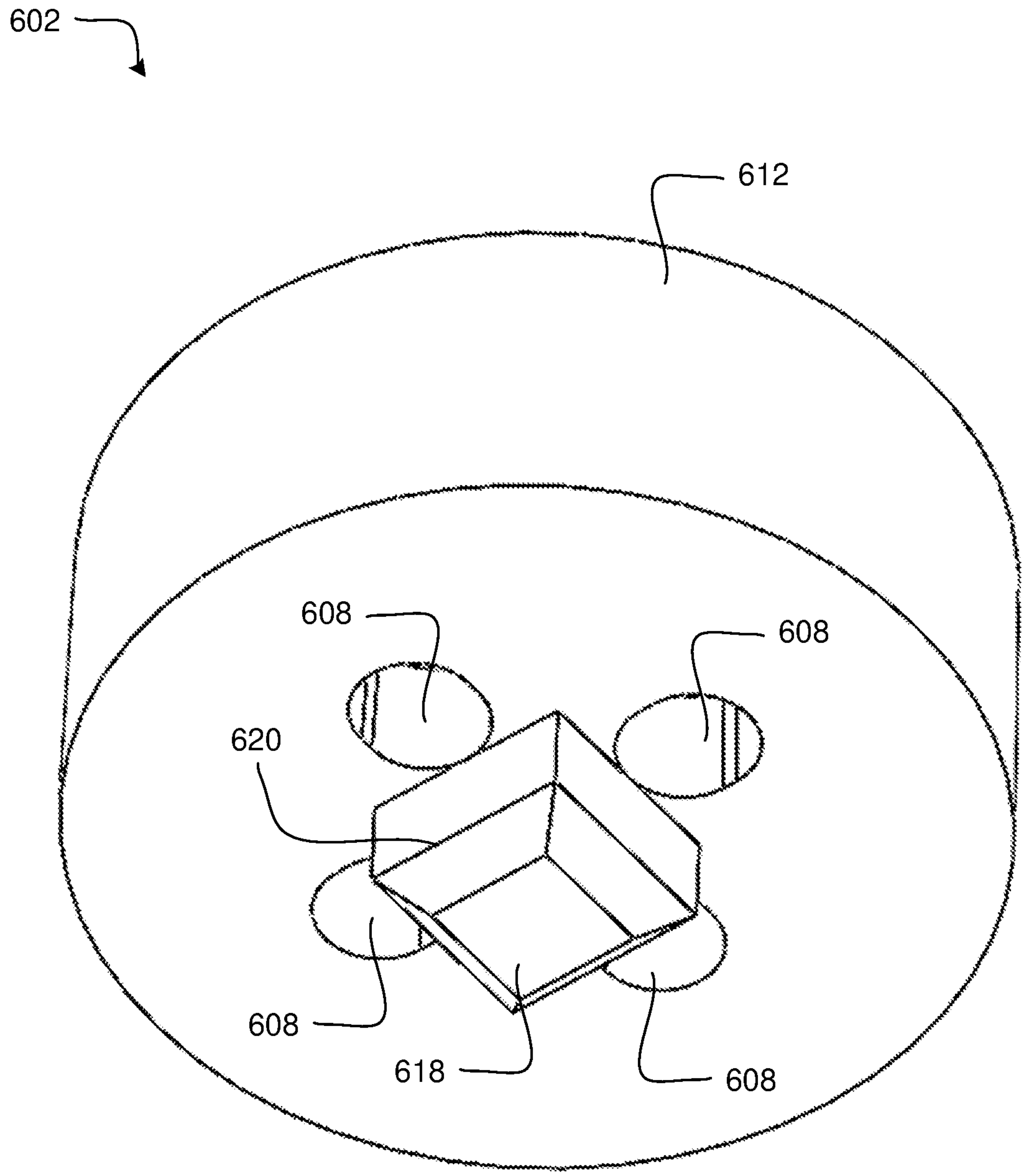
FIG. 6 illustrates a perspective view of an insert for maintaining positional optimizations between antenna array components.
Figure 7:
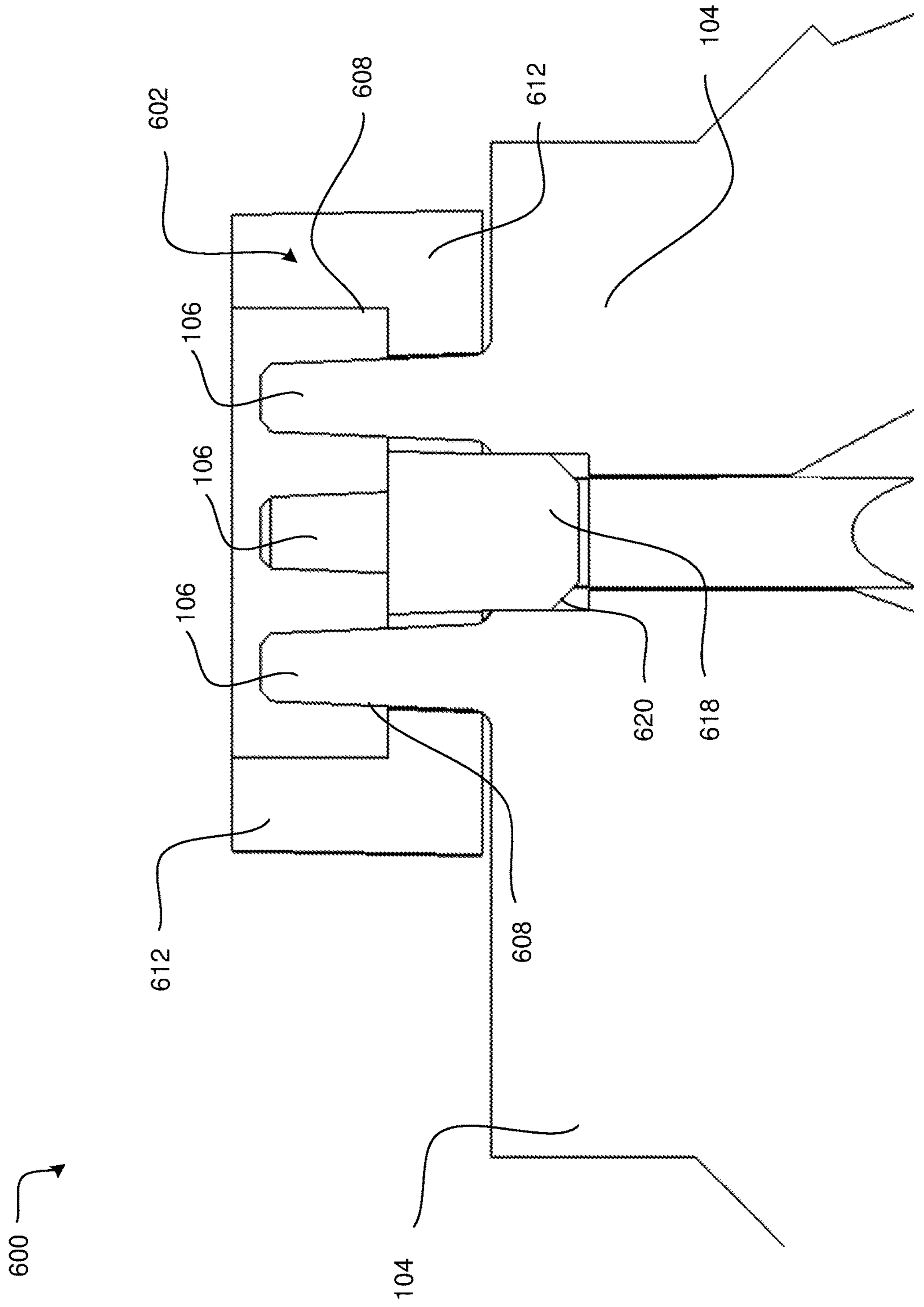
FIG. 7 illustrates a straight-on cross-sectional side view of a support system that includes an insert for maintaining positional optimizations between antenna array components.
Figure 8:
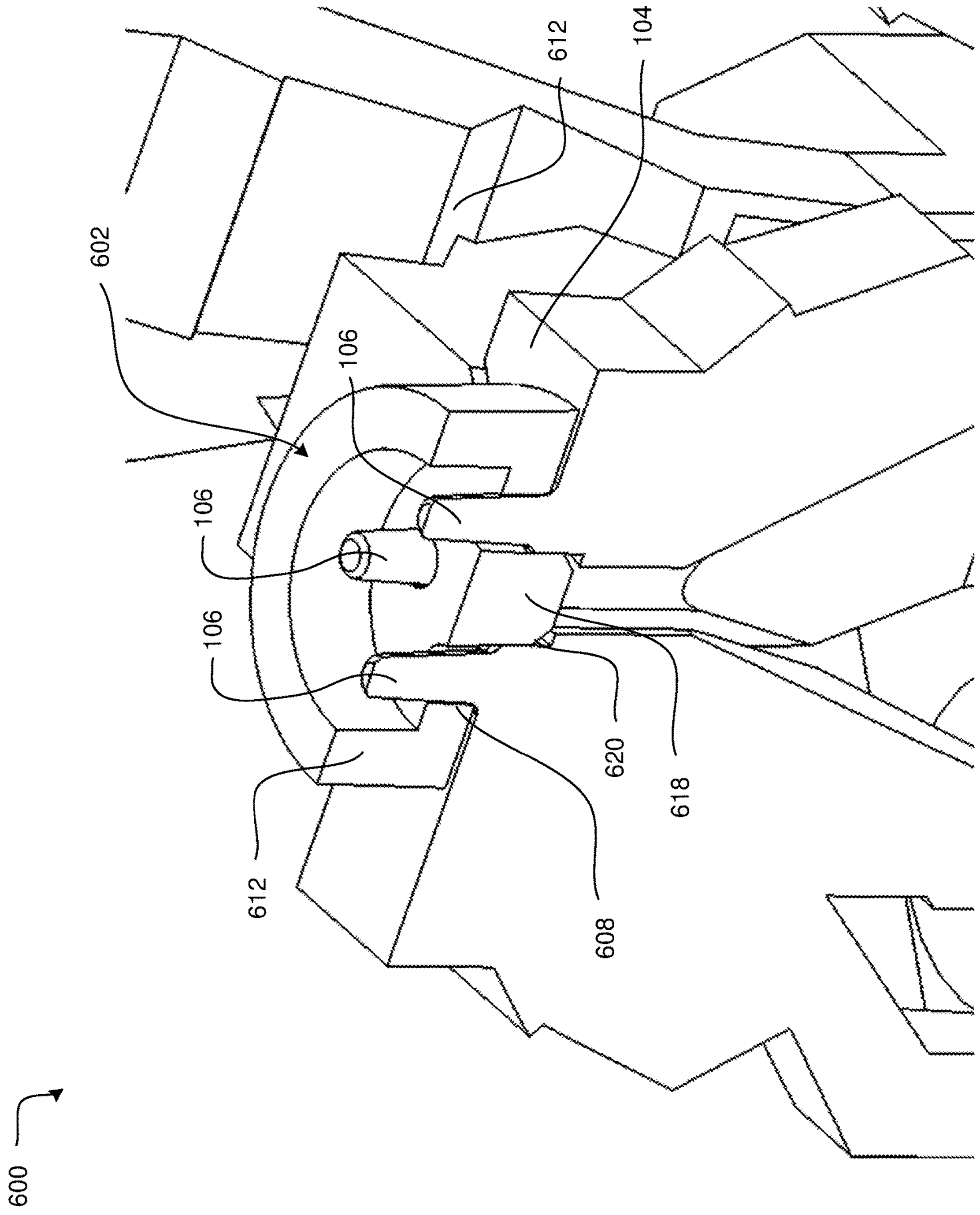
FIG. 8 illustrates a perspective cross-sectional view of a support system that includes an insert for maintaining positional optimizations between antenna array components.

FIGS. 6-8 illustrate a support system 600, wherein the support system 600 represents an alternative embodiment compared with the support system 100 described in connection with FIGS. 1-5. FIG. 6 is a perspective view of an upper insert 602, wherein the upper insert 602 illustrated in FIG. 6 represents an alternative embodiment of the upper insert 102 discussed in connection with FIGS. 1-5. The upper insert 602 may be utilized in combination with any of the antenna array components described herein. FIG. 7 is a straight-on cross-sectional side view of the system 600, with the upper inset 602 disposed within an antenna array. FIG. 8 is a perspective cross-sectional view of the system 600, with the upper inset 602 disposed within the antenna array.

The upper insert 602 includes a stud 612 and one or more horn receptacles 608 forming holes disposed through the stud 612. Each of the horn receptacles 608 is configured to receive and secure a corresponding alignment horn (not pictured in FIG. 6) of an antenna array. The stud 612 has a "partially closed" interior space, wherein the interior space does not include any support regions 110 disposed between horn receptacles 108, as shown in the stud 112 of FIGS. 1-3. Instead, the stud 612 includes four horn receptacles 608 that are each sized such that a corresponding alignment horn 106 may be disposed therethrough to form a pressure fit with the antenna array.

The upper insert 602 additionally includes a plug 618 configured to provide gap and alignment support for the radiating elements 104 of the antenna array (not pictured in FIG. 6). The upper insert 602 is specifically configured for an orthogonal pair of radiating elements, wherein each side of the plug 618 is disposed adjacent to an antenna radiating element 104. The plug 618 include chamfered edges 620 to improve the ease of insetting the upper insert 602 into the antenna array.

As shown in FIG. 7, the alignment horns 106 will not extend above a rim of the stud 612 of the upper insert 602 according to the embodiment illustrated in FIGS. 6-8. The radiating elements 104 may be three-dimensionally printed with a cutaway for insertion of the plug 618. This enables the upper insert 602 to form a secure compression fit with the sides of the radiating elements 104, and thus ensure the alignment of the radiating elements 104.

FIG. 8 illustrates a perspective cross-sectional view of the system 600 and specifically depicts how the alignment horns 106 are disposed through the horn receptacles 608 of the upper insert 602. As shown in FIG. 8, the alignment horns 106 may be sized such that they do not extend above an upper rim of the stud 612.

Figure 9:
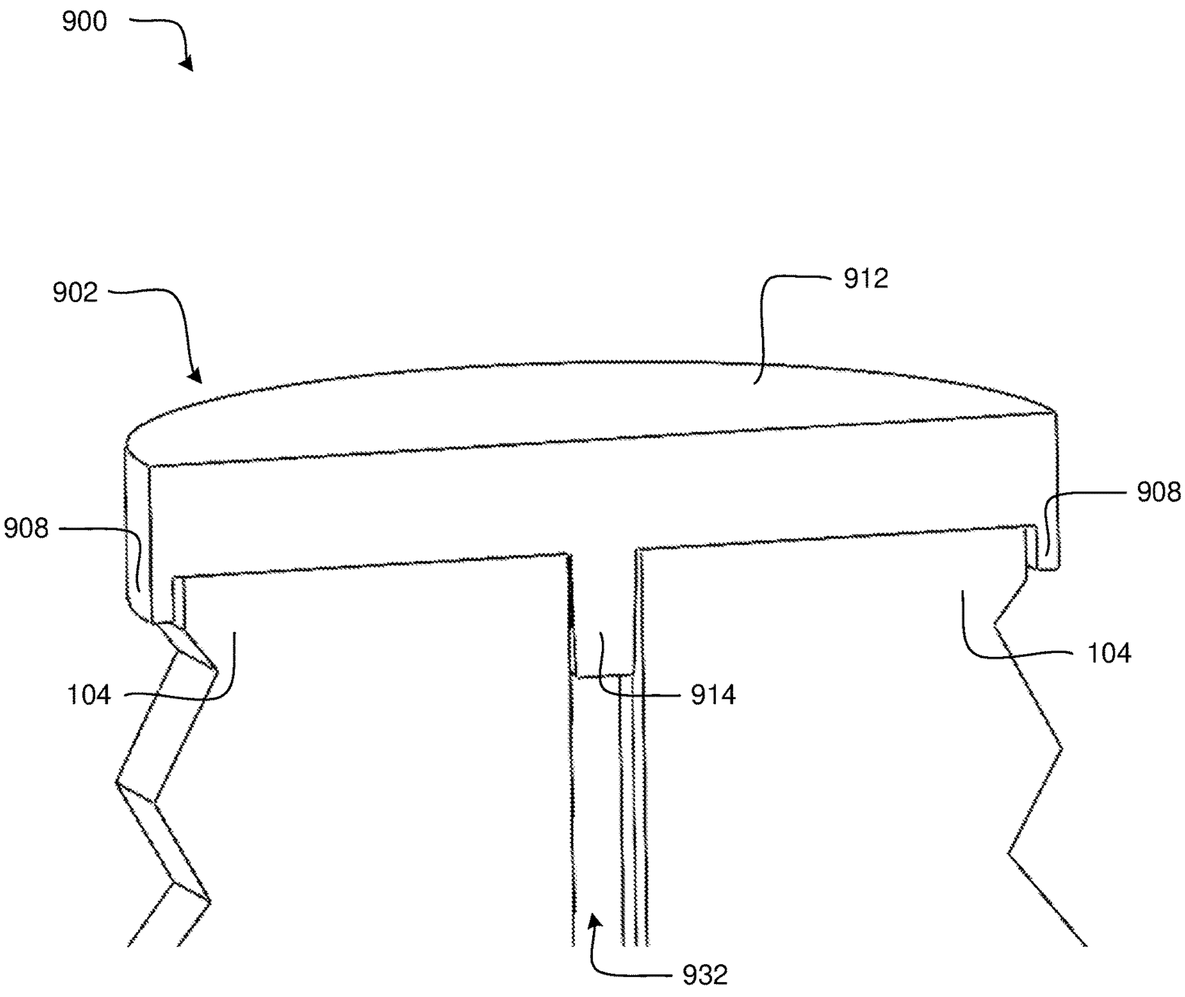
FIG. 9 illustrates a perspective cross-sectional view of a support system that includes an insert for maintaining positional optimizations between antenna array components.

FIG. 9 illustrates a support system 900, wherein the support system 900 represents an alternative embodiment compared with the support systems 100, 600 described in connection with FIGS. 1-5 and FIGS. 6-8, respectively. FIG. 9 is a cross-sectional perspective view of a support system 900 including an upper insert 902 disposed within an antenna array to maintain optimized gaps between radiating elements 104.

The upper insert 902 includes a stud 912 and one or more snap-fit fasteners 908 attached to the stud 912. In the implementation illustrated in the cross-sectional view of FIG. 9, the one or more snap-fit fasteners 908 is configured as a singular snap-fit fastener 908 that encircles the multiple radiating elements 104. The snap-fit fastener is configured to snap on to one or more components of the antenna array and may specifically snap on to a side of a radiating element 104 as shown in FIG. 9.

The upper insert 902 may additionally include one or more positional fins 914 attached to the stud. The positional fins 914 are configured to be disposed between pairs of radiating elements 104 to maintain the optimized gaps between each pair of radiating elements 104. As shown in FIG. 9, the position fin 914 is specifically implemented to maintain the optimized negative airspace 932 disposed between radiating elements 104.

Figure 10:
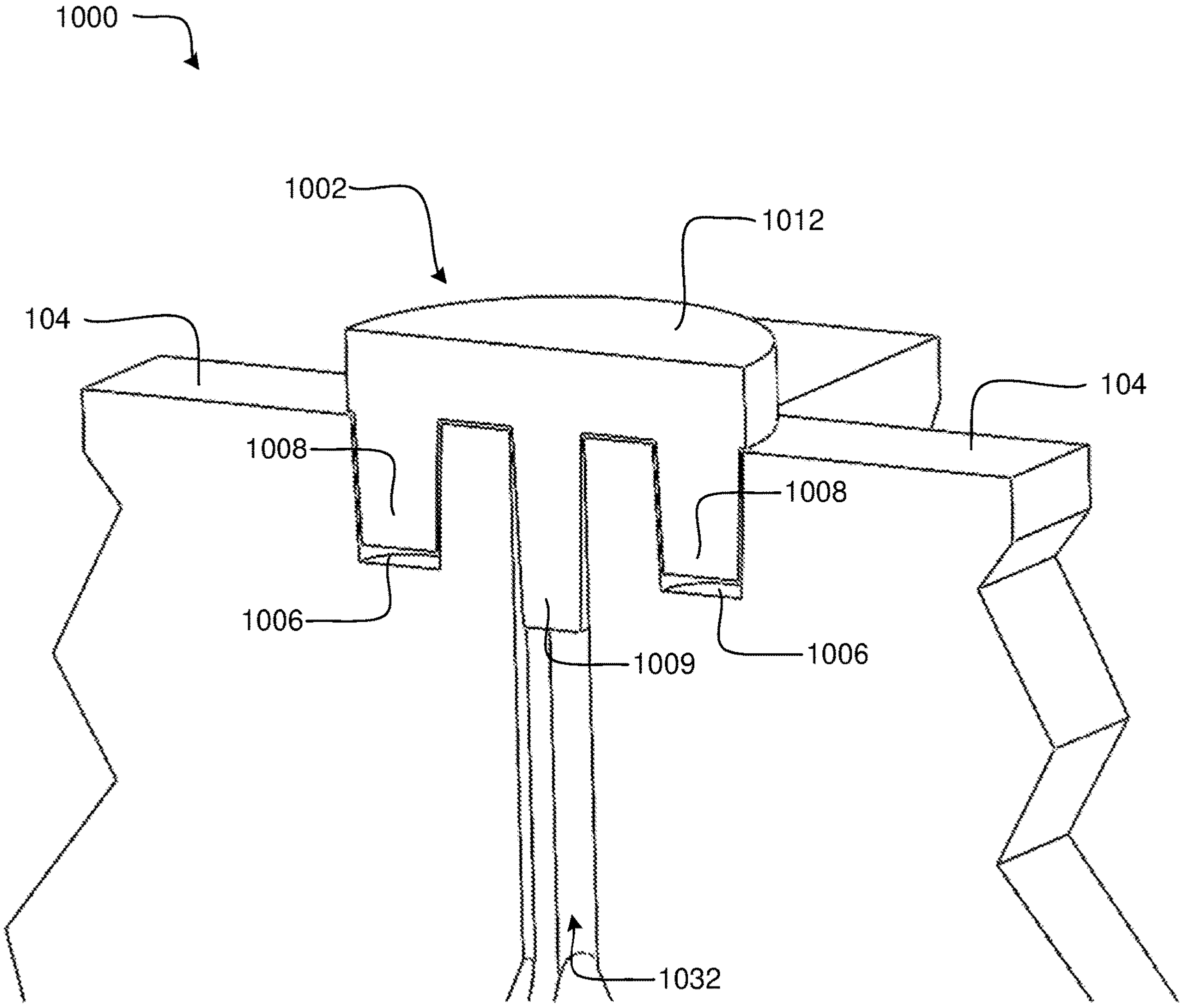
FIG. 10 illustrates an exploded perspective cross-sectional view of a support system that includes an insert for maintaining positional optimizations between antenna array components.
Figure 11:
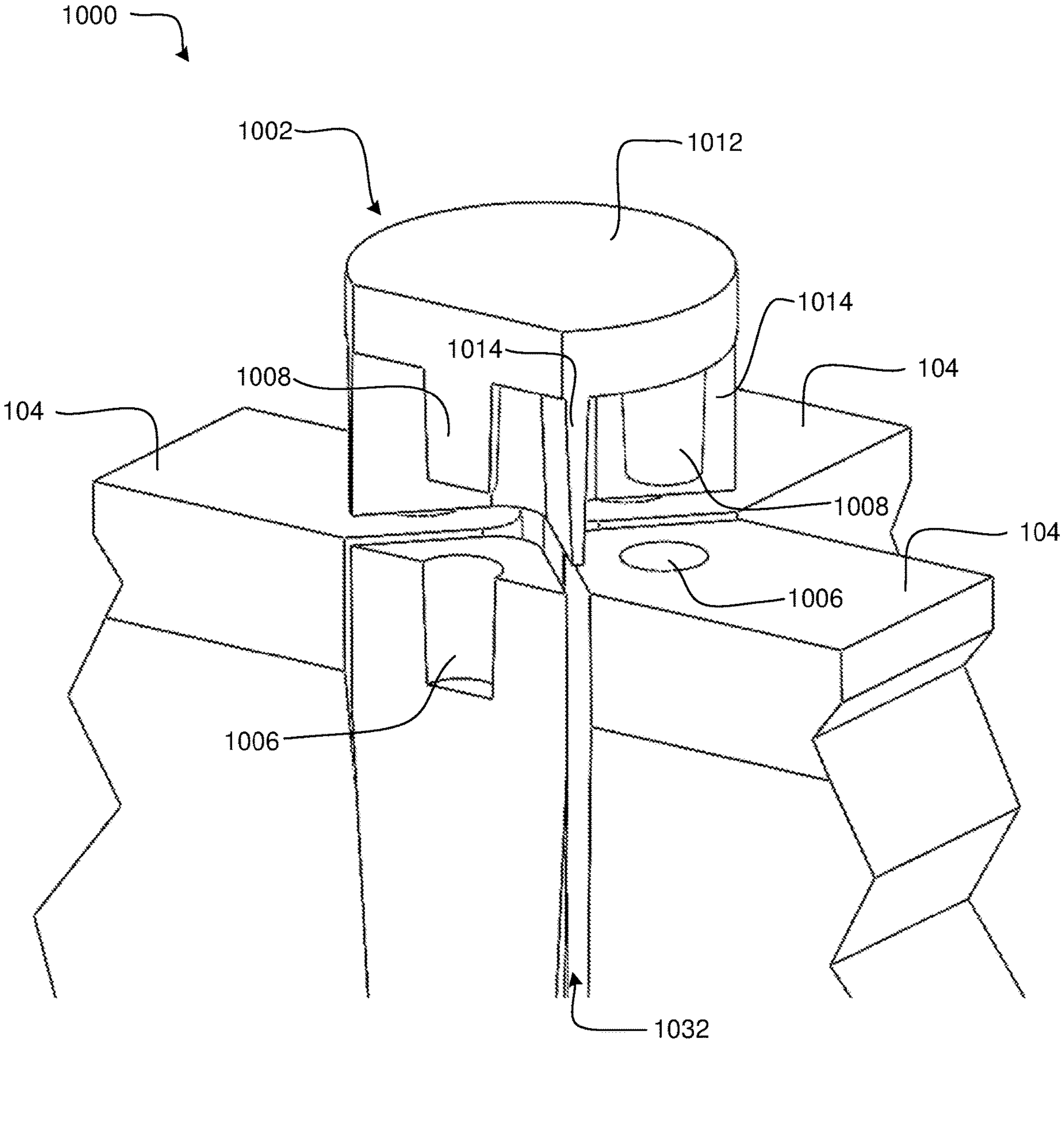
FIG. 11 illustrates a perspective cross-sectional view of a support system that includes an insert for maintaining positional optimizations between antenna array components.

FIGS. 10 and 11 illustrate yet another embodiment of a support system 1000, wherein the support system 1000 represents an alternative embodiment compared with the support systems 100, 600, 900 described herein. FIG. 10 illustrates a cross-sectional perspective view of the support system 1000, wherein an upper insert 1002 is disposed within an antenna array to maintain positional optimizations between radiating elements 104 of the antenna array. FIG. 11 illustrates an exploded cross-sectional perspective view of the support system 1000, wherein the upper insert 1002 is "floating" above the antenna array.

The upper insert 1002 includes a stud 1012 and one or more positional horns 1008 attached to the stud 1012. Each of the one or more positional horns 1008 is configured to be disposed within a corresponding positional cavity 1006 formed within the radiating elements 104 of the antenna array. The upper insert 1002 may additionally include a central positional horn 1009 configured to be disposed within a negative airspace 1032 formed in a central region defined by the radiating elements 104.

As shown specifically in the exploded view of FIG. 11, the upper insert 1002 additionally includes one or more fins 1014 attached to the stud 1012. The fins 1014 are configured to be disposed between radiating elements 104 to maintain the optimized gaps between neighboring radiating elements 104. The system 1000 may rely mainly on an interference fit and/or snap fit formed between corresponding positional cavities 1006 and positional horns 1008 to ensure the upper insert 1002 remains within the antenna array. The fins 1014 may form an interference fit with neighboring radiating elements 104, but the fins 1014 are primarily implemented to maintain the optimized negative airspace 1032 formed between neighboring radiating elements 104.

The upper inserts 102, 602, 902, 1002 described herein are manufactured from any suitable dielectric material. Dielectric materials include insulating materials that do not readily conduct electricity. Dielectric materials may be used in various applications where electrical insulation, alignment, or specific electromagnetic performance are desired. The dielectric material selected for the upper insert 102 may specifically be selected based on its material properties of permittivity and loss tangent over the frequency of operation of an antenna. Dielectric materials that may be utilized for the upper insert 102 include, for example, FR-4 (Flame Retardant-4), Rogers RT/duroid laminates, Delrin, Ultem, Liquid Crystal Polymer (LCP), ceramic substrates, alumina ($Al_2O_3$), aluminum nitride, polytetrafluorethylene (PTFE), fluoropolymers, polymers, plastics, polyethylene (PE), polypropylene (PP), polyvinyl chloride (PVC), and others.

The upper inserts 102, 602, 902, 1002 may be injected molded for medium or high-volume manufacturing. The upper insert 102 may include the draft-on fins 114 to aid in spreading the radiating elements 104, and additionally to aid in injection molding manufacturability.

Figure 12:
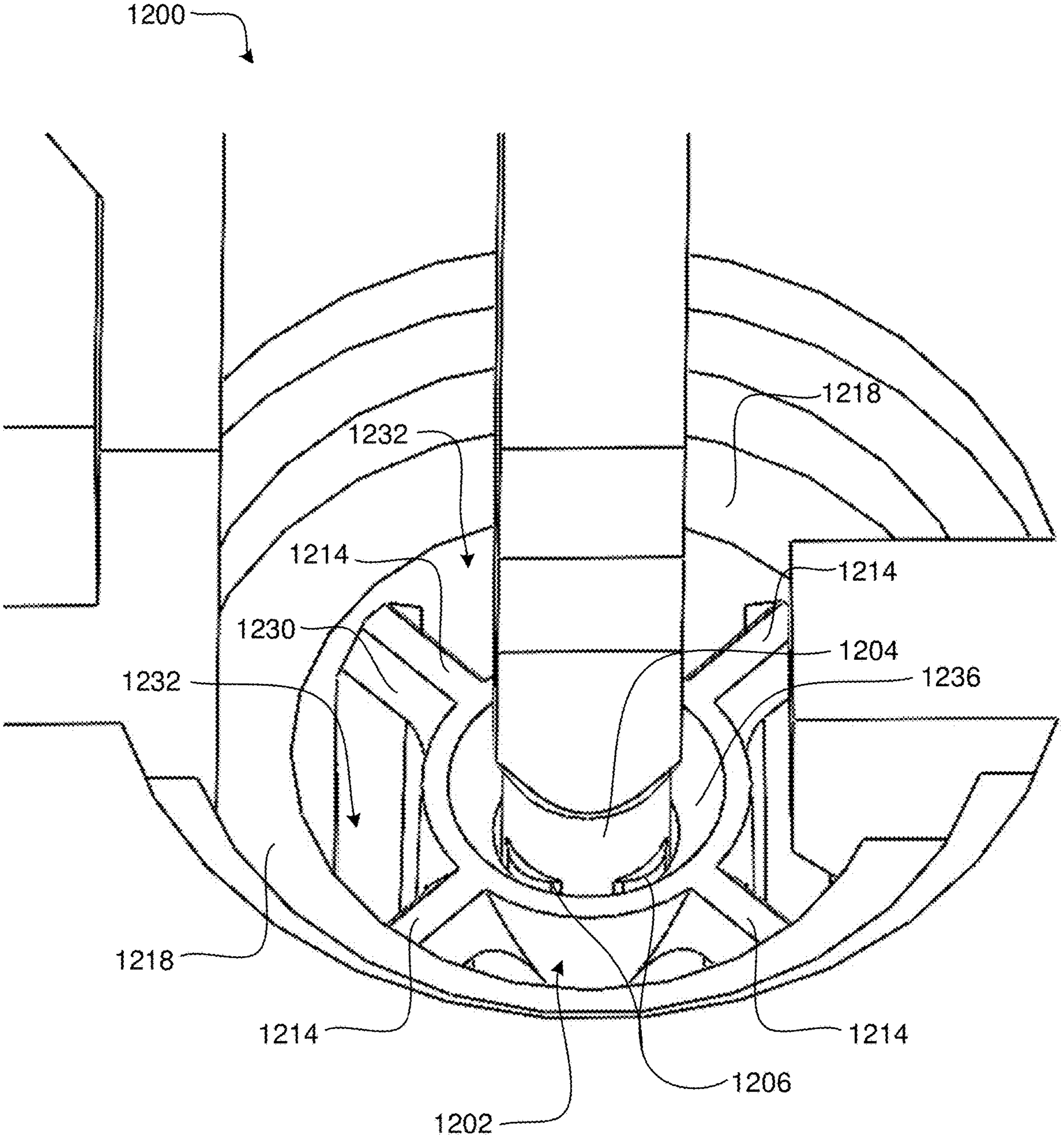
FIG. 12 illustrates a perspective view of a support system that includes an insert for maintaining positional optimizations between a coaxial pin and surrounding components of an antenna array.
Figure 13:
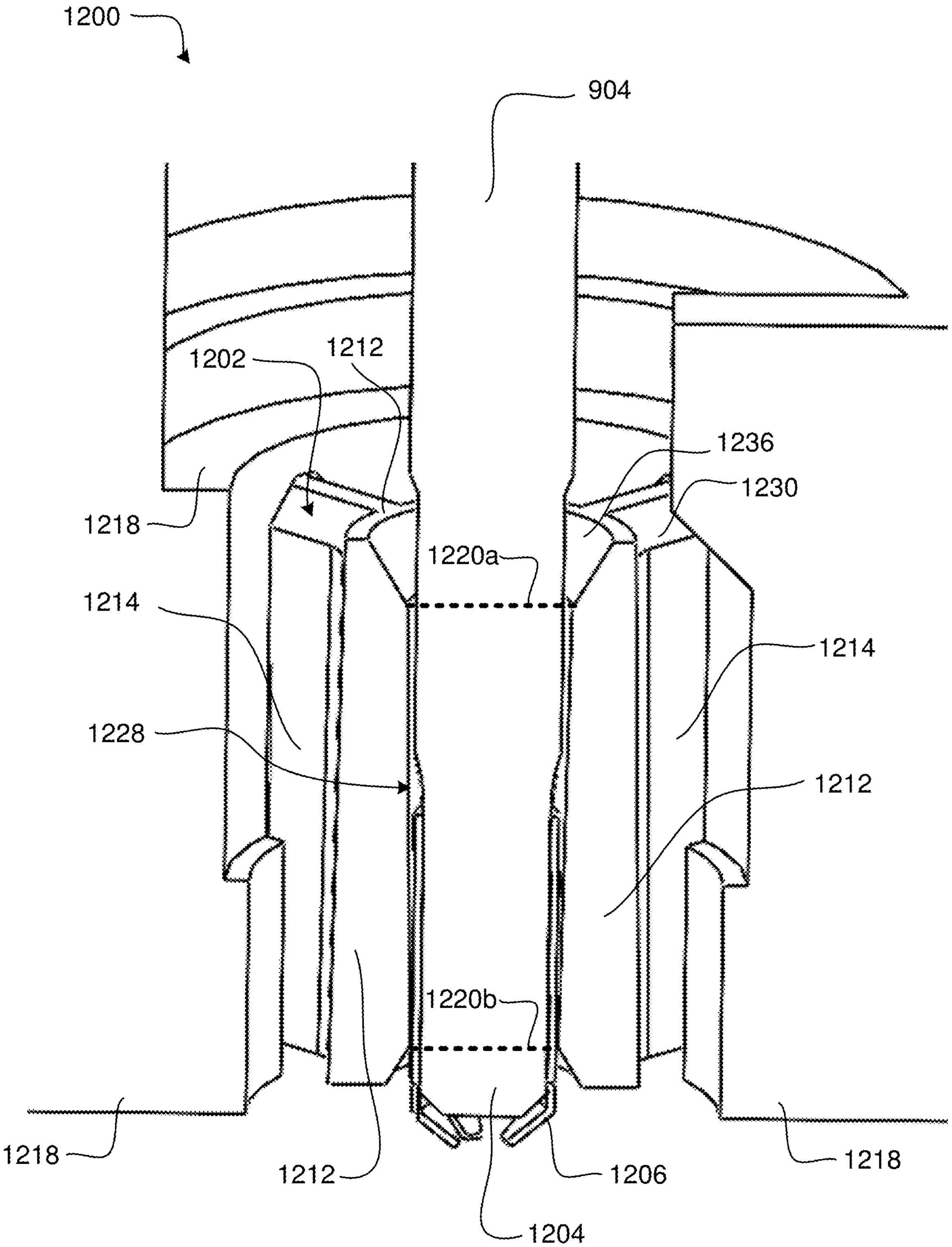
FIG. 13 illustrates a cross-sectional side view of a support system that includes an insert for maintaining positional optimizations between a coaxial pin and surrounding components of an antenna array.
Figure 14:
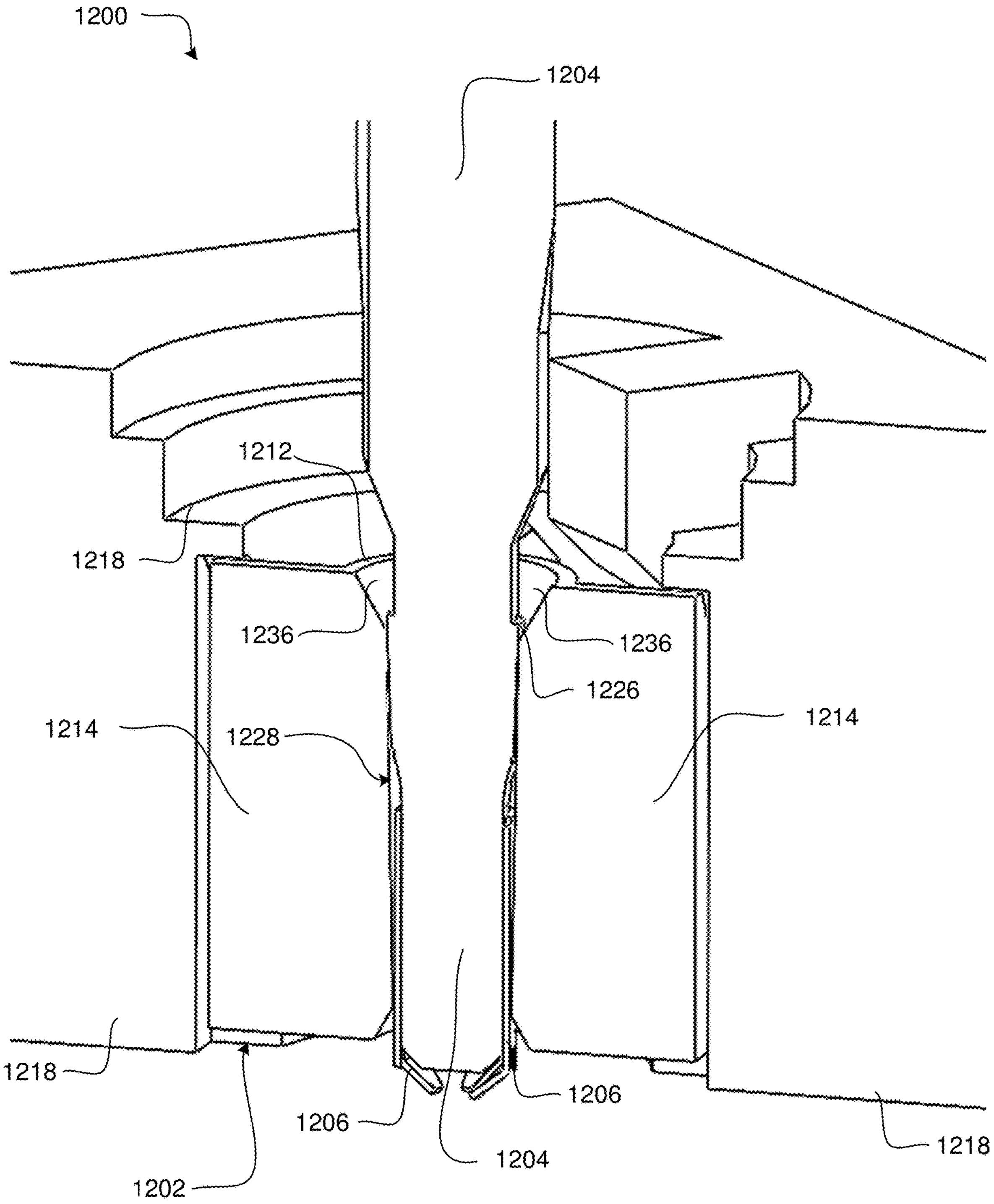
FIG. 14 illustrates a cross-sectional side view of a support system that includes an insert for maintaining positional optimizations between a coaxial pin and surrounding components of an antenna array.
Figure 15:
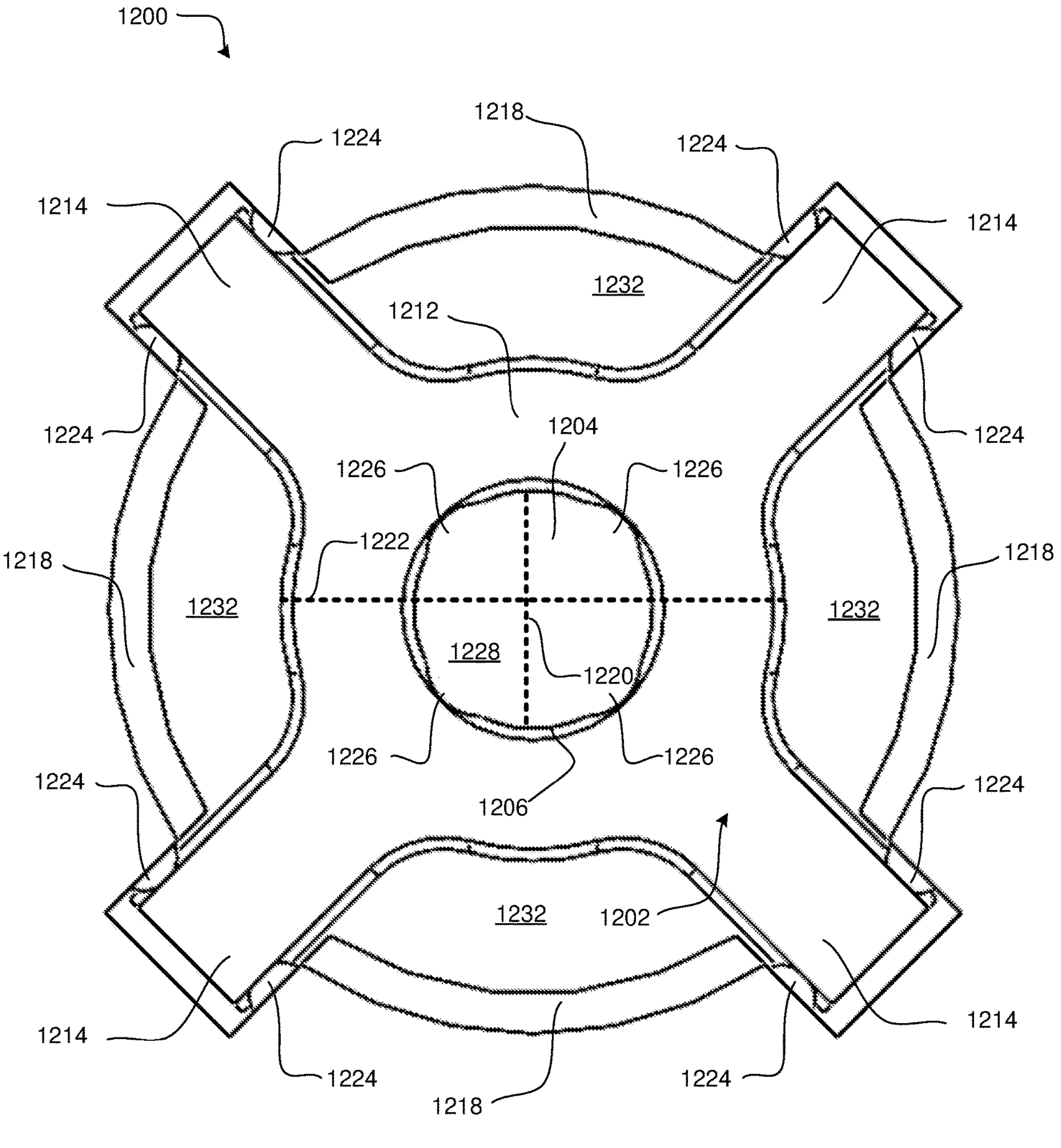
FIG. 15 illustrates a cross-sectional top-down aerial view of a support system that includes an insert for maintaining positional optimizations between a coaxial pin and surrounding components of an antenna array.
Figure 16:
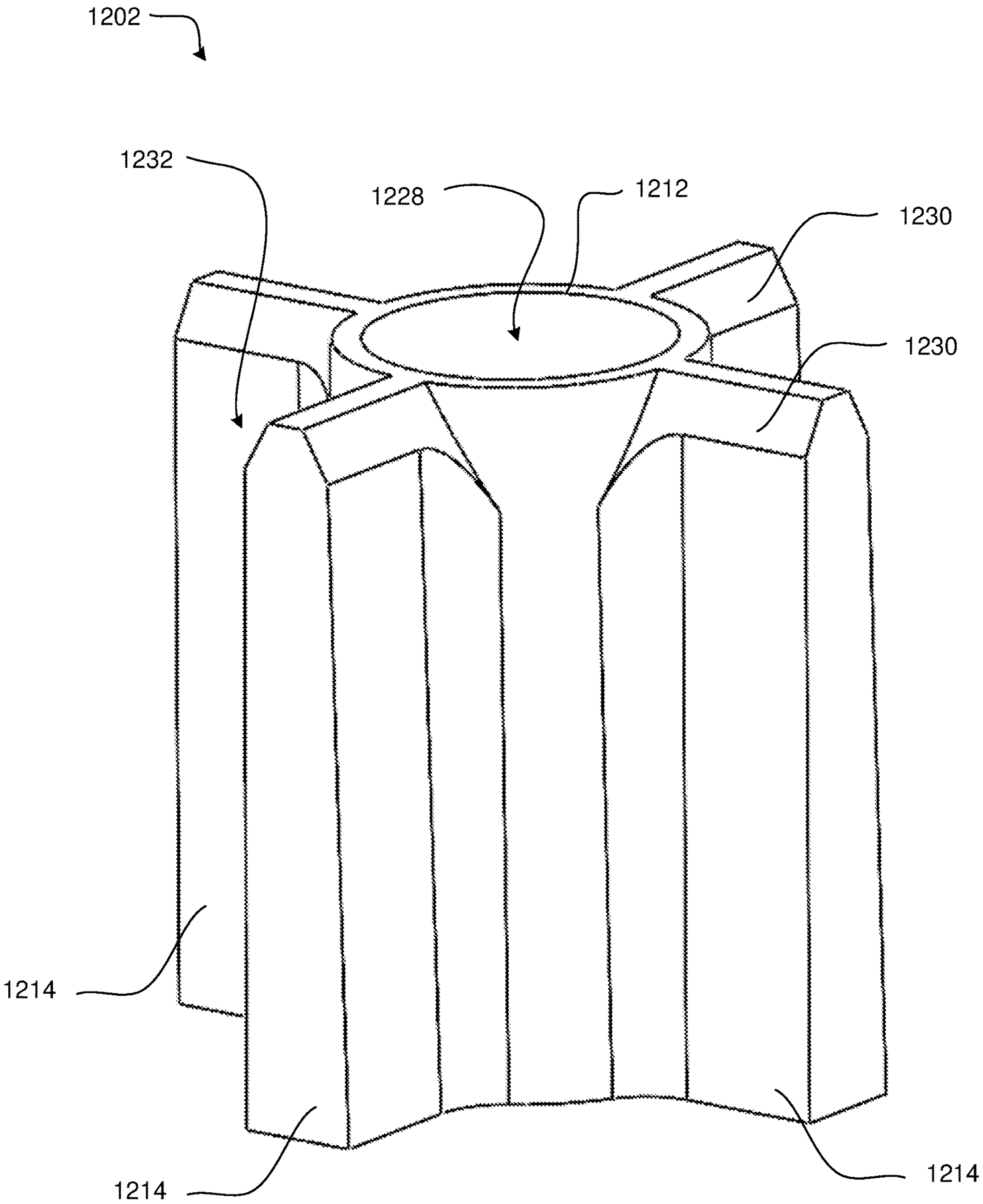
FIG. 16 illustrates a perspective view of an insert for maintaining positional optimizations between a coaxial pin and surrounding components of an antenna array.

Referring now to FIGS. 12-16, these figures illustrate a support system 1200 for a lower side of an antenna array. Specifically, FIGS. 12-16 illustrate a press-fit lower insert configured to hold a coaxial pin into position. FIG. 12 is a perspective view of the support system 1200 that includes a lower insert 1202 disposed around a coaxial pin 1204. FIG. 13 is a straight-on cross-sectional side view of the support system 1200 illustrating the lower insert 1202 disposed around the coaxial pin 1204. FIG. 14 is a perspective cross-sectional side view of the support system 1200 illustrating the lower insert 1202 disposed around the coaxial pin 1204. FIG. 15 is a cross-sectional top-down aerial view of the support system 1200 illustrating the lower insert 1202 disposed around the coaxial pin 1204. FIG. 16 is a perspective view of the lower insert 1202.

Like the upper inserts 102, 602, 902, 1002 described herein, the lower insert 1202 aids in controlling positioning and dimensional gaps between features of an antenna array. Specifically, the lower insert 1202 aids in stabilizing the spacing between a coaxial pin 1204 and surrounding components of an antenna array such that the coaxial pin is located in the center of the coaxial waveguide. A single antenna array may include each of an upper insert 102, 602, 902, 1002 and the lower insert 1202. Alternatively, a single antenna array may include only one of the upper insert 102, 602, 902, 1002 or the lower insert 1202, depending on the implementation. Each of the upper inserts 102, 602, 902, 1002 and the lower insert 1202 as described herein are manufactured with a dielectric material.

Antenna arrays are configured to receive, transmit, and propagate electromagnetic waves, which include radio waves. Sometimes these electromagnetic waves must further be propagated through coaxial waveguides, comprised of coaxial pins 1204 and the surrounding conductive elements 1218, and then to circuit boards or other electrical components. It is important to ensure these electromagnetic waves can successfully propagate between the antenna array and the circuit board (or other electrical component), without detrimental energy losses. The coaxial pin 1204 may be manufactured as an integrated component of the antenna array such that the coaxial pin is an indivisible component of the antenna array. The lower insert 1202 is separately manufactured of a dielectric material and is later pressed into the antenna array to maintain the optimized gap between the coaxial pin 1204 and the surrounding antenna components.

As shown in FIG. 12-15, the coaxial pin 1204 may be sheathed in a spring pin 1206 to improve electromagnetic communication between the coaxial pin 1204 and a circuit board (or another electrical component). The spring pin 1206 is electromagnetically conductive and is configured to encase the coaxial pin 1204. Typically, the longitudinal axis of the coaxial pin 1204 is oriented normal to the circuit board (not shown). The spring pin 1206 forms a blind-mate connection against the circuit board, and this blind-mate connection enables electromagnetic communication between the coaxial pin 1204 and the circuit board, even where the circuit board is warped or twisted, and thus does not make direct contact with the coaxial pin 1204.

The lower insert 1202 serves as a dielectric positional stabilizer disposed between the spring pin 1206 and the surrounding components of the antenna array. The lower insert 1202 includes a shaft 1212 and a plurality of fins 1214 attached to the shaft 1212. Each of the plurality of fins 1214 extends radially outward relative to the shaft 1212 and fit within grooves of the conductive elements 1218 of the antenna array, which represents the outer coaxial conductor in the coaxial waveguide created by the coaxial pin 1204 and the conductive elements 1218. The shaft 1212 includes a wall arranged in one or more of a hollow cylindrical geometry or a hollow conical frustum geometry. In some implementations, a portion of the wall of the shaft 1212 comprises the hollow cylindrical geometry, and another portion of the wall of the shaft 1212 comprises the hollow conical frustum geometry. The hollow space defined by the wall of the shaft 1212 is referred to herein as the central hollow space 1228. The central hollow space 1228 is optimized for receiving the coaxial pin 1204 and spring pin 1206 therein. The shaft 1212 may include a chamfered edge 1236 that broadens an inner diameter of the shaft to reduce friction between the coaxial pin and the dielectric insert when initially installing the dielectric insert within the antenna array.

As shown specifically in FIG. 15, the wall of the shaft 1212 defines an inner diameter 1220, which defines a crosswise dimension of the hollow space 1228 that is configured to receive the coaxial pin 1204 sheathed within the spring pin 1206. The wall of the shaft 1212 further defines an outer diameter 1222, which defines the overall diameter of the shaft 1212. The difference between the outer diameter 1222 and the inner diameter 1220 is equal to a thickness of the wall of the shaft 1212. The height (i.e., length) of the shaft 1212 is optimized based on the length of the corresponding coaxial pin 1204. The inner diameter 1220 is optimized to produce an interference fit between the inner wall of the central hollow space 1228 and the outer wall of the coaxial pin 1204.

The wall of the shaft 1212 may comprise a hollow cylindrical geometry, and in this implementation, the inner diameter 1220 and the outer diameter 1222 remain constant along the height of the shaft 1212. However, in other implementations, the wall of the shaft 1212 comprises a hollow conical frustum geometry. In this implementation, at least the inner diameter 1220 of the shaft 1212 changes along the height of the shaft 1212. The outer diameter 1222 may remain constant or change in parallel with the inner diameter 1220. This is specifically illustrated in FIG. 13, wherein the wall of the shaft 1212 defines a proximal inner diameter **1220*a*, which is proximal to a point where the coaxial pin 1204 attaches to the antenna array. The wall of the shaft 1212 further defines a distal inner diameter 1220*b*, which is distal to the point where the coaxial pin 1204 attaches to the antenna array. In the implementation illustrated in FIG. 13, the proximal inner diameter 1220*a* is greater than the distal inner diameter 1220*b*. This may be optimized to reduce friction between the coaxial pin 1204 and the shaft 1212 of the lower insert 1202 during initial installation (when sliding the lower insert 1202 around the coaxial pin 1204/spring pin 1206), but to ultimately ensure a tight interference fit between the lower insert 1202 and the coaxial pin 1204/spring pin 1206. Thus, the upper/proximal region of the shaft 1212 comprises a larger diameter, because the upper/proximal region of the shaft 1212 will be the portion that slides up the coaxial pin 1204. Conversely, the lower/distal region of the shaft 1212 comprises the smaller diameter because the lower/distal region of the shaft 1212 aids in maintaining the interference fit between the coaxial pin 1204 and the lower insert 1202**.

The fins 1214 are attached to the outer surface of the wall of the shaft 1212. The fins 1214 extend radially outward relative to a center point of the shaft 1212. The lower insert 1202 is configured such that there is negative airspace 1232 between each of the plurality of fins 1214. The dielectric material of the lower insert 1202 is known to exacerbate energy losses within the antenna array, and thus it is beneficial to reduce the amount of dielectric material and maintain as much negative airspace 1232 as possible. The lower insert 1202 is thus configured to maintain the position of the coaxial pin 1204 while reducing the amount of dielectric material. As shown specifically in FIG. 16, the fins 1214 may include chamfered edges 1230 to improve the ease of sliding the lower insert 1202 into the antenna array.

The lower insert 1202 is disposed within the antenna array and surrounded by conductive elements 1218 of the antenna array. The conductive elements 1218 of the antenna array may include any suitable component of an antenna array, including, for example, radiating elements or structural elements defining waveguides, combiners, dividers, and so forth. The coaxial pin 1204 itself is surrounded by one or more conductive elements 1218 of the antenna array.

Because the antenna array is manufactured using additive manufacturing techniques, it is challenging to control tolerances sufficiently to achieve a traditional interference fit between the inner wall of the shaft 1212 and the coaxial pin 1204 (and the spring pin 1206 sheathed around the coaxial pin 1204). To compensate for this difficulty, the antenna array may be printed with additional nubs 1224, 1226 to improve reliability of the interference fit between the lower insert 1202 and the coaxial pin 1204. The antenna array may be printed with nubs 1224 that will contact the fins 1214 of the lower insert 1202. Additionally, the coaxial pin 1204 of the antenna array may be printed with nubs 1226 that will contact the inner wall of shaft 1212.

The lower insert 1202 described herein is manufactured from any suitable dielectric material. Dielectric materials include insulating materials that do not readily conduct electricity. Dielectric materials may be used in various applications where electrical insulation, energy storage, or polarization effects are desired. The dielectric material selected for the lower insert 1202 may specifically be selected based on its material properties of permittivity and loss tangent over the frequency bandwidth of operation of the antenna. Dielectric materials that may be utilized for the upper insert 102 include, for example, FR-4 (Flame Retardant-4), Rogers RT/duroid laminates, Delrin, Ultem, Liquid Crystal Polymer (LCP), ceramic substrates, alumina ($Al_2O_3$), aluminum nitride, polytetrafluorethylene (PTFE), fluoropolymers, polymers, plastics, polyethylene (PE), polypropylene (PP), polyvinyl chloride (PVC), and others.

Figure 17:
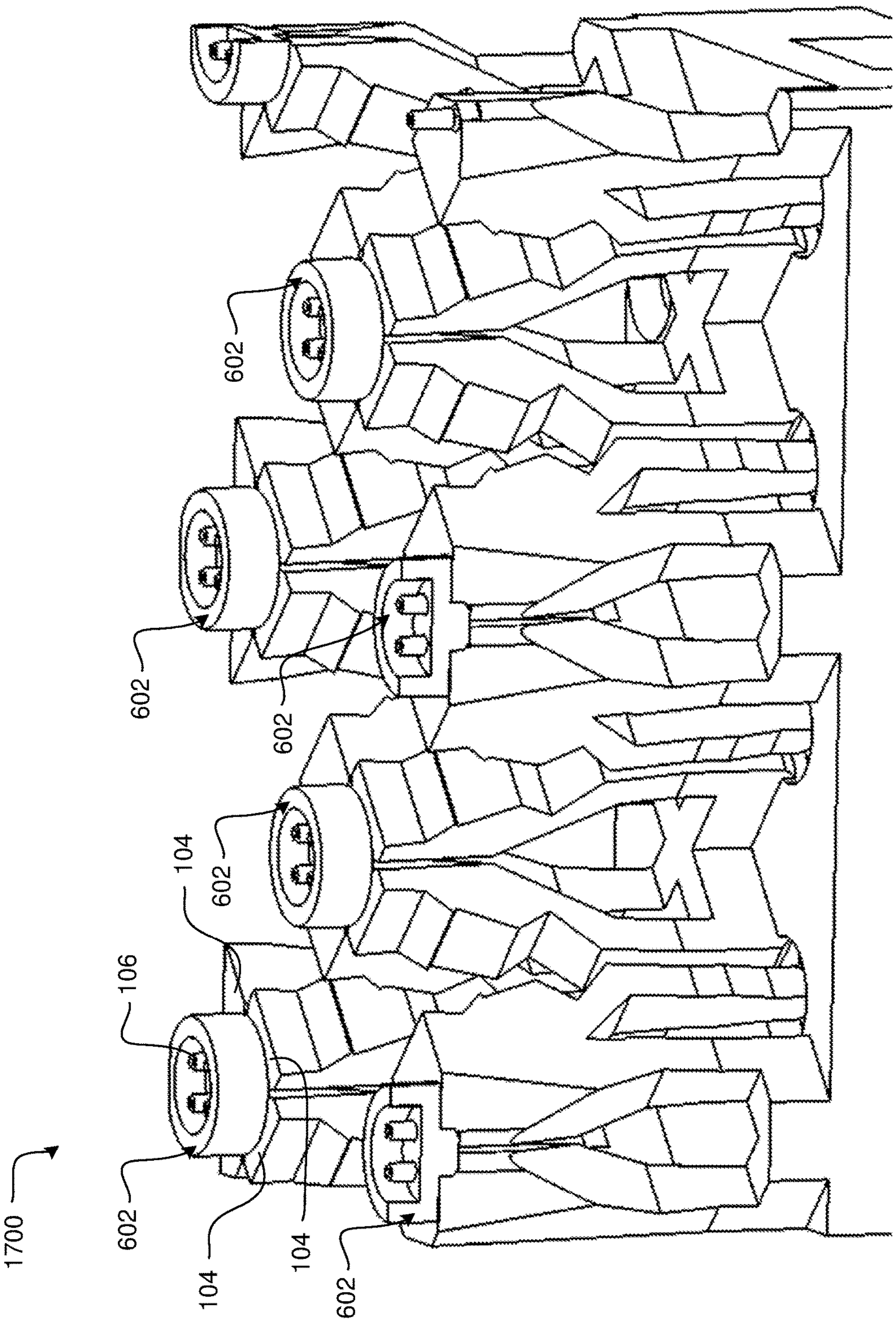
FIG. 17 illustrates a perspective view of a portion of an antenna array that includes inserts for maintaining positional optimizations between antenna array components.

FIG. 17 is a perspective view of a system 1700 comprising components of an antenna array and further comprising the upper insert 602 as described herein. The radiating elements 104 shown are dipoles within a dual orthogonal tightly coupled dipole array, wherein an unbalanced coaxial pin feeds a signal ear which is adjacent to a ground ear in the dipole. As shown in FIG. 17, a single section of the antenna array includes a plurality of radiating elements 104 and further includes the upper insert 602 forming an interference fit with the alignment horns 106 to maintain positioning of the radiating elements 104 of the antenna array. The system 1700 additionally includes further conductive components of the antenna array.

Figure 18A:
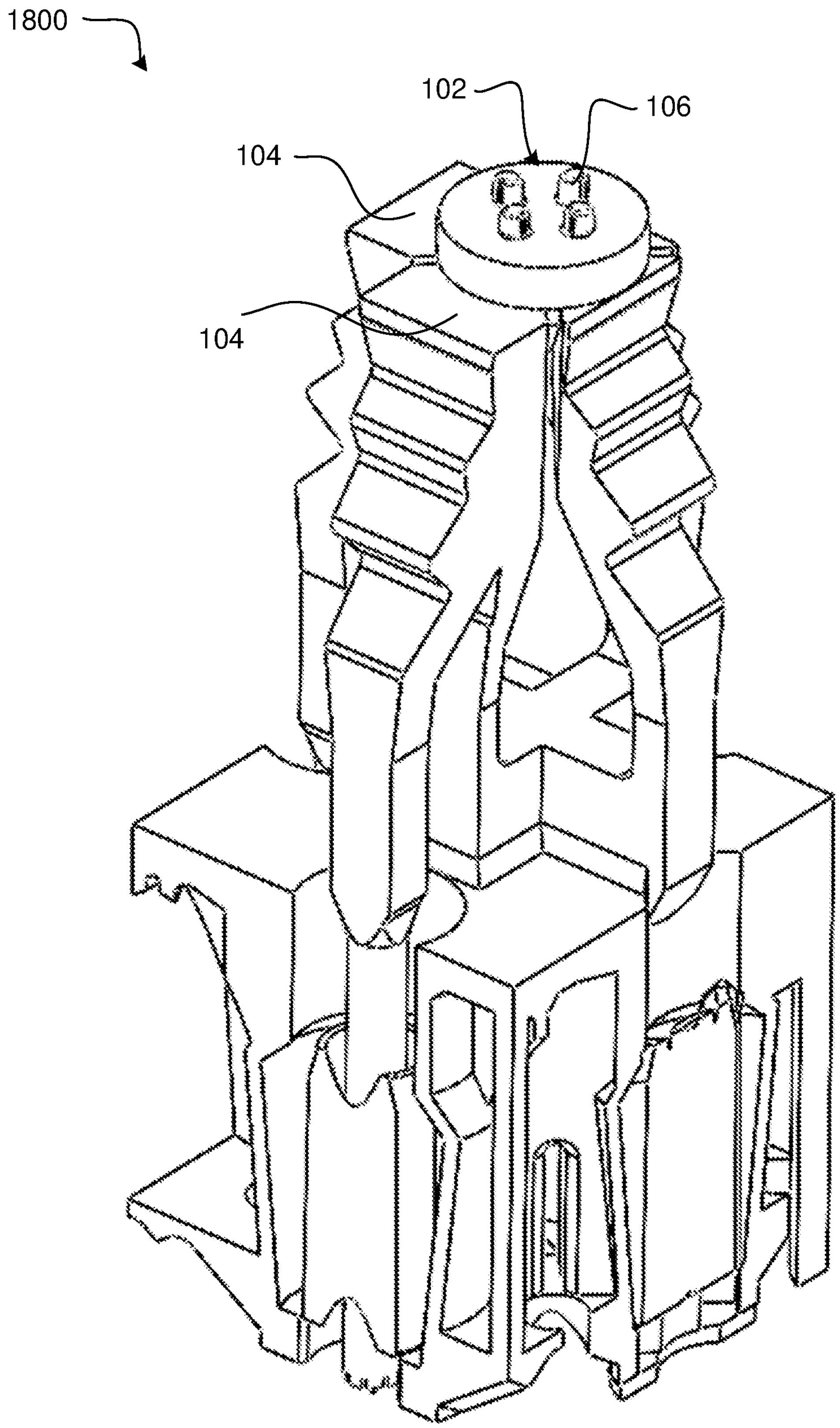
FIG. 18A illustrates a perspective view of a single portion of an antenna array that includes an insert for maintaining positional optimizations between antenna array components.

FIGS. 18A-18D illustrate components of an antenna array 1800, wherein the upper insert 102 is disposed within the antenna array 1800 to maintain positioning between radiating elements 104. FIG. 18A is a perspective view of a unit lattice element of a tightly coupled dipole antenna array 1800, wherein the antenna array 1800 comprises one or more unit lattice elements to create the full antenna array.

Figure 18B:
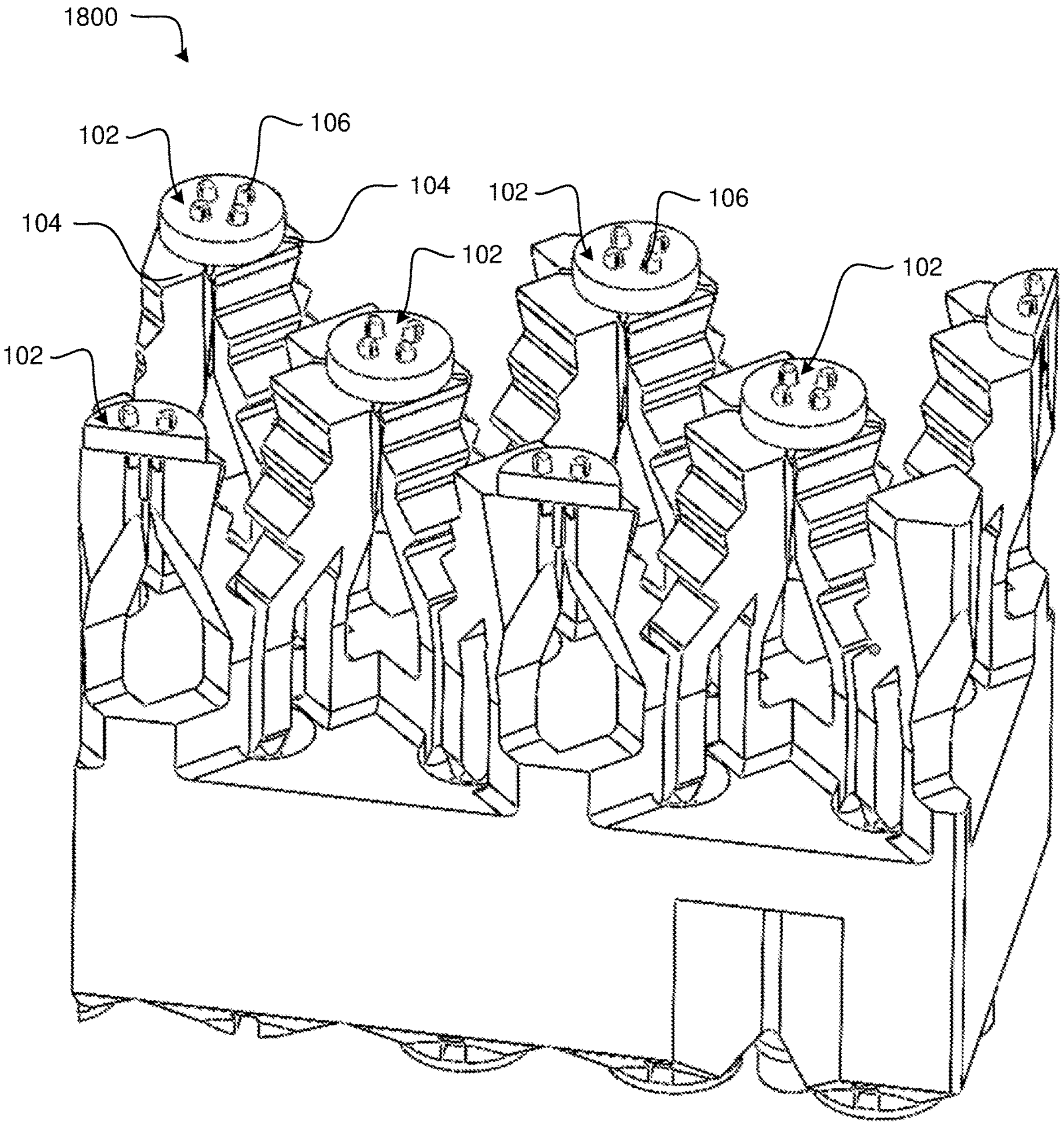
FIG. 18B illustrates a perspective view of multiple portions of an antenna array that includes inserts for maintaining positional optimizations between antenna array components.
Figure 18C:
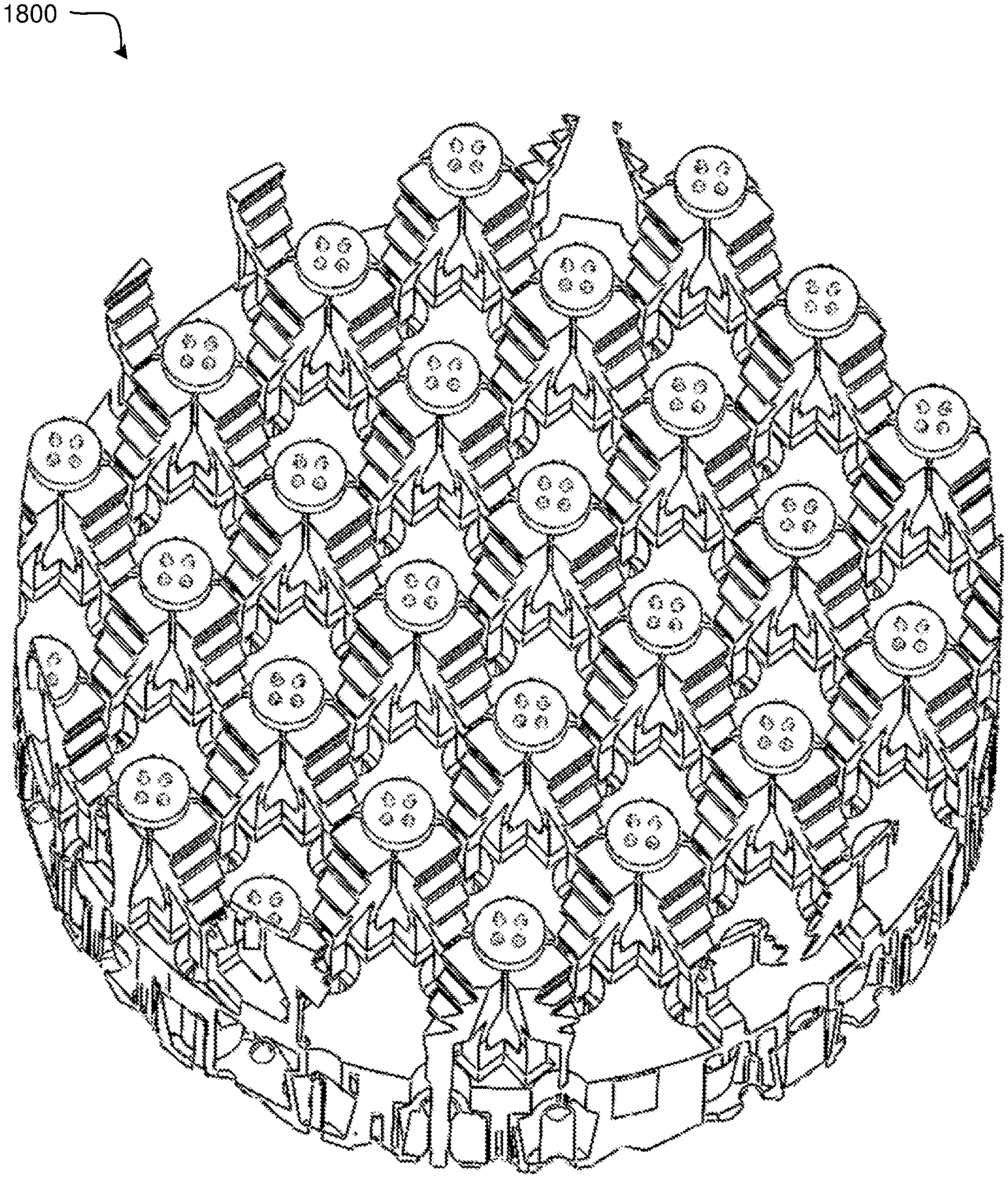
FIG. 18C illustrates a perspective view of multiple portions of an antenna array that includes inserts for maintaining positional optimizations between antenna array components.
Figure 18D:
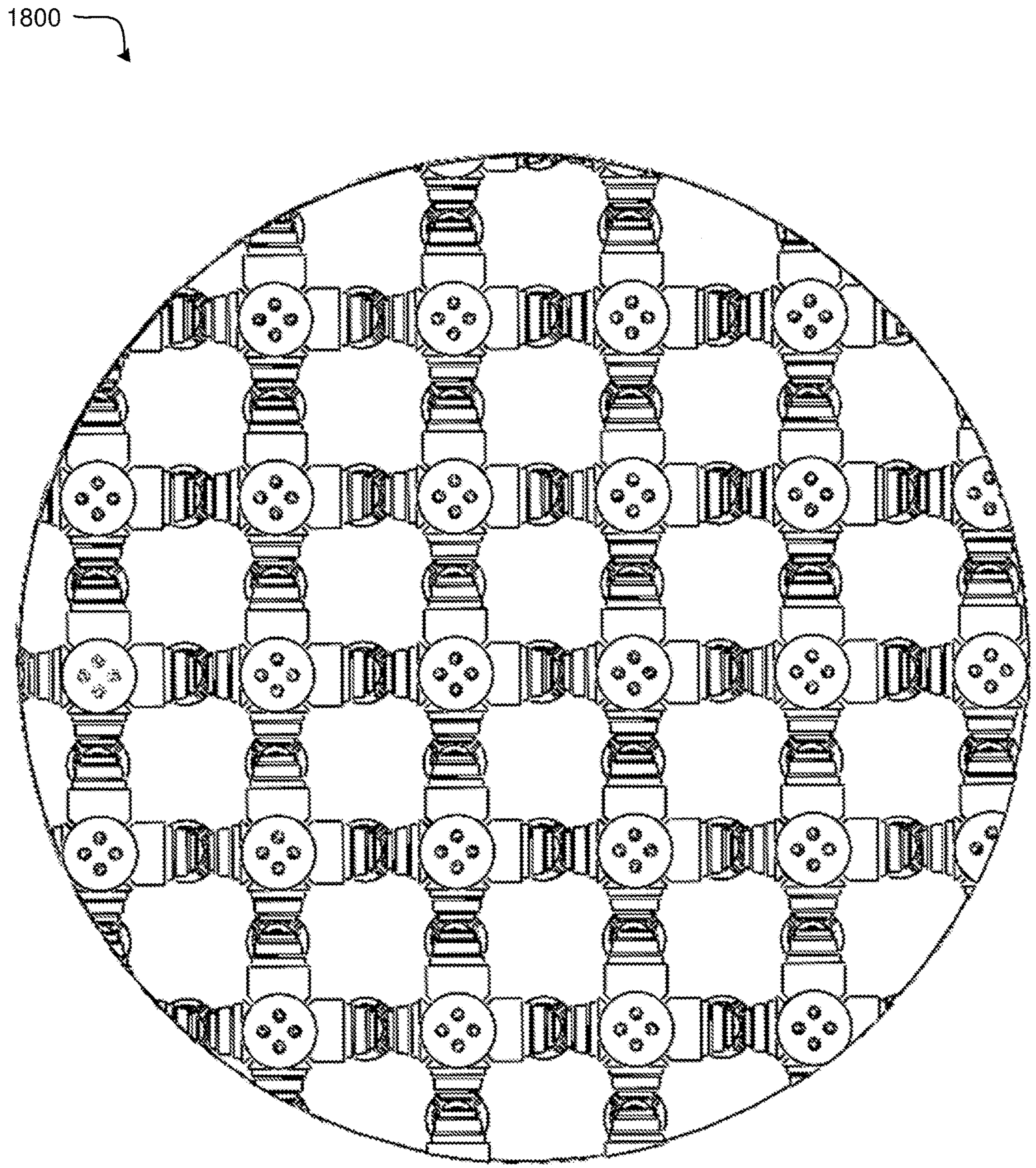
FIG. 18D illustrates a straight-on top-down aerial view of multiple portions of an antenna array that includes inserts for maintaining positional optimizations between antenna array components.

FIG. 18B is a perspective view of an array of unit lattice elements arrayed together to form an antenna array 1800. FIG. 18C is a perspective view of a cutout of the antenna array 1800 with a set of central elements. FIG. 18D is a straight-on top-down aerial view of the antenna array 1800 illustrating the set of central elements first illustrated in FIG. 18C. The antenna array 1800 is arranged such that the upper insert 102 is disposed between radiating elements 104 to maintain optimized spacing between pairs of orthogonal radiating elements 104.

Figure 19:
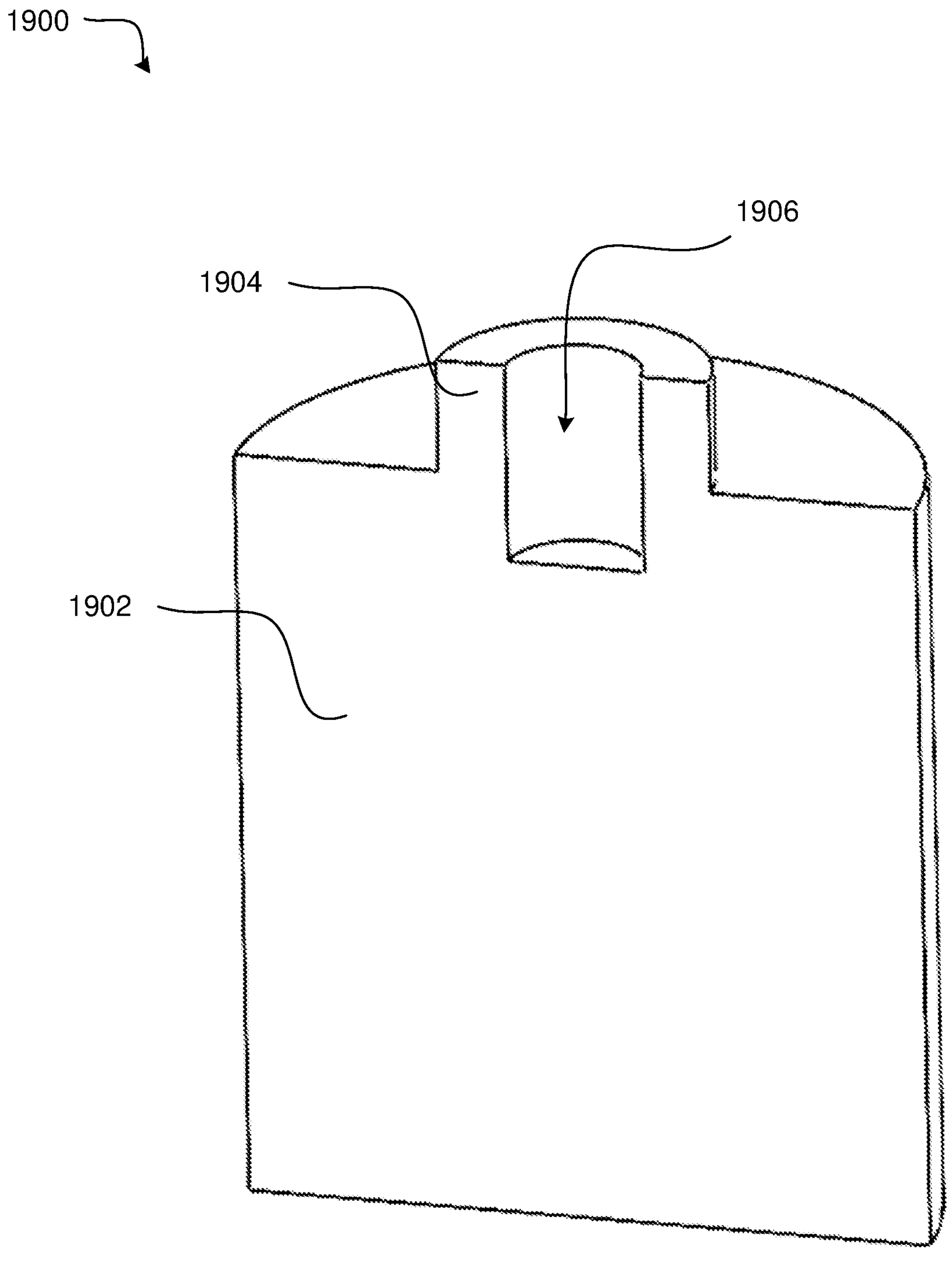
FIG. 19 illustrates a cross-sectional perspective view of an installation tool to aid in installing a dielectric insert within an antenna array.

FIG. 19 illustrates a cross-sectional perspective view of an installation tool 1900 to aid in pressing the lower insert 1202 into an antenna array. The installation tool 1900 includes a body 1902 and a hollow depression guide 1904 attached to the body 1902. The hollow depression guide 1904 defines an interior space 1906. The interior space 1906 is sized for accommodating the coaxial pin 1204 when the lower insert 1202 is guided and depressed around the coaxial pin 1204.

Figure 20:
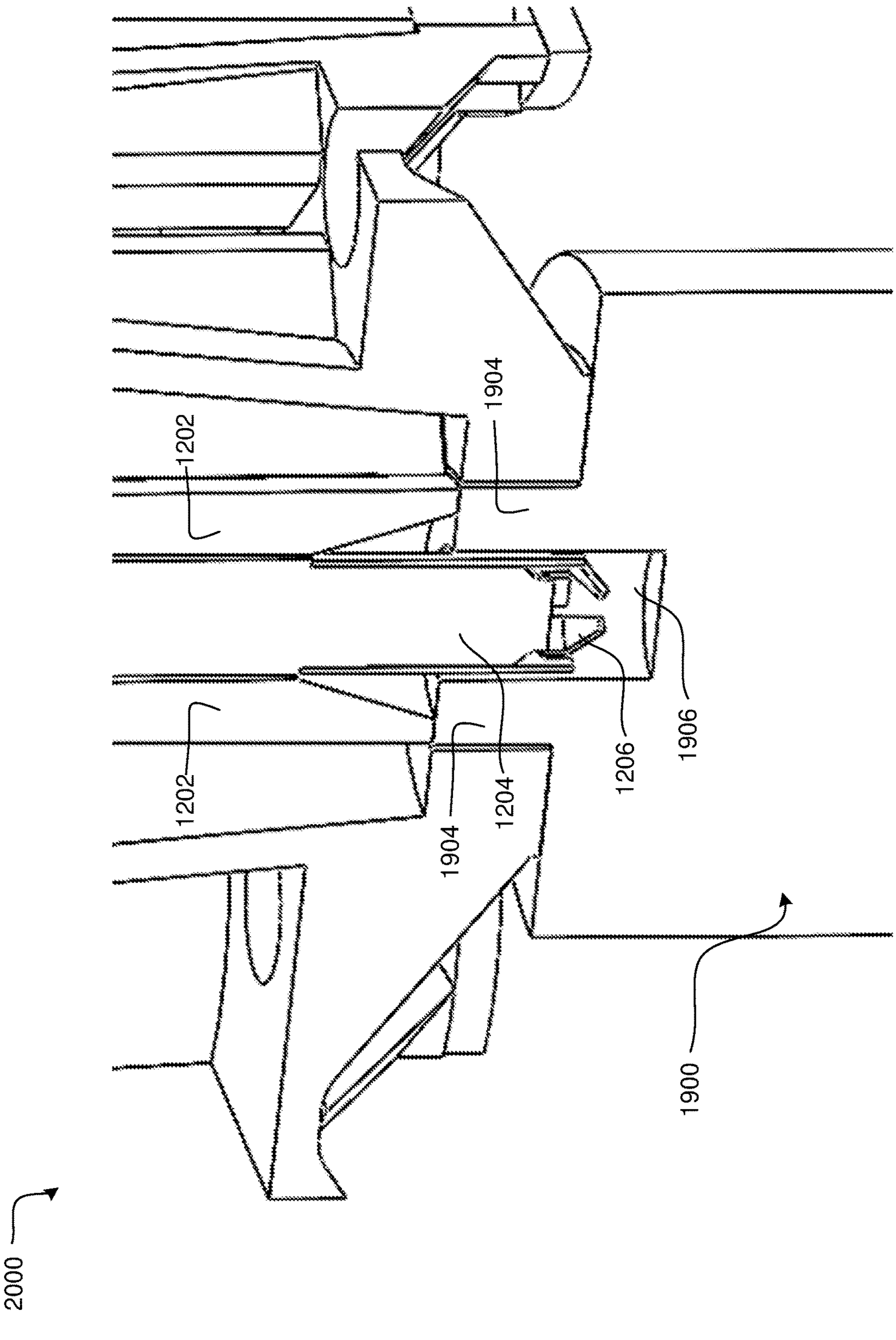
FIG. 20 illustrates a cross-sectional perspective view of a system for installing an insert around a coaxial pin with the aid of an installation tool.

FIG. 20 illustrates a cross-sectional perspective view of an installation process 2000 for installing the lower insert 1202 around the coaxial pin 1204 with the aid of the installation tool 1900. As shown in FIG. 20, the hollow depression guide 1904 may be pressed up against the lower insert 1202 to press the lower insert 1202 up into the antenna array.

EXAMPLES

The following examples pertain to further embodiments.

Example 1 is an antenna array. The antenna array includes a radiating element configured to receive or transmit an electromagnetic signal. The antenna array includes an alignment horn attached to the radiating element, wherein the alignment horn comprises a detent end. The antenna array is such that the radiating element and the alignment horn are manufactured together as a single element by a three-dimensional printing process such that manufacturing the single element does not require a separate joining process for joining separate components.

Example 2 is an antenna array as in Example 1, wherein the detent end of the alignment horn is a detent ball.

Example 3 is an antenna array as in any of Examples 1-2, wherein the alignment horn further comprises a shaft; wherein the detent end is attached to a distal end of the shaft; and wherein a proximal end of the shaft is attached to the radiating element.

Example 4 is an antenna array as in any of Examples 1-3, wherein the alignment horn further comprises a shaft, and wherein the shaft comprises a conical frustrum geometry.

Example 5 is an antenna array as in any of Examples 1-4, wherein the conical frustrum geometry of the shaft comprises a proximal end and a distal end; wherein the proximal end is attached to the radiating element and comprises a proximal diameter; wherein the distal end is attached to the detent end and comprises a distal diameter; and wherein the proximal diameter is longer than the distal diameter.

Example 6 is an antenna array as in any of Examples 1-5, wherein the antenna array comprises four radiating elements arranged in a orthogonal pair.

Example 7 is an antenna array as in any of Examples 1-6, wherein the four radiating elements arranged in the orthogonal pair comprises: a first dipole comprising a first radiating element; a second dipole comprising a second radiating element; a third dipole comprising a third radiating element; and a fourth dipole comprising fourth radiating element.

Example 8 is an antenna array as in any of Examples 1-7, wherein arrangement of the four radiating elements arranged in the orthogonal pair comprises: a first radiating element disposed adjacent to a second radiating element such that a first-second gap exists between the first radiating element and the second radiating element; the second radiating element further disposed adjacent to a third radiating element such that a second-third gap exists between the second radiating element and the third radiating element; the third radiating element further disposed adjacent to a fourth radiating element such that a third-fourth gap exists between the third radiating element and the fourth radiating element; and the fourth radiating element further disposed adjacent to the first radiating element such that a fourth-first gap exists between the fourth radiating element and the first radiating element.

Example 9 is an antenna array as in any of Examples 1-8, further comprising a dielectric insert, wherein the dielectric insert is manufactured of a dielectric material; and wherein the dielectric insert is configured to maintain spacing between the four radiating elements arranged in the orthogonal pair.

Example 10 is an antenna array as in any of Examples 1-9, wherein the dielectric insert comprises: a first fin disposed between the first radiating element and the second radiating element to maintain the first-second gap; a second fin disposed between the second radiating element and the third radiating element to maintain the second-third gap; a third fin disposed between the third radiating element and the fourth radiating element to maintain the third-fourth gap; and a fourth fin disposed between the fourth radiating element and the first radiating element to maintain the fourth-first gap.

Example 11 is an antenna array as in any of Examples 1-10, wherein the dielectric insert further comprises a stud, and wherein each of the first fin, the second fin, the third fin, and the fourth fin is attached to the stud.

Example 12 is an antenna array as in any of Examples 1-11, wherein the stud comprises a horn receptacle disposed therethrough, and wherein the horn receptacle is configured to receive the alignment horn.

Example 13 is an antenna array as in any of Examples 1-12, wherein the antenna array comprises an independent alignment horn attached to each of the four radiating elements arranged in the orthogonal pair such that the antenna array comprises at least four alignment horns; and wherein the stud comprises four horn receptacles disposed therethrough.

Example 14 is an antenna array as in any of Examples 1-13, wherein the four horn receptacles comprises: a first horn receptacle configured to receive a first alignment horn attached to a first radiating element; a second horn receptacle configured to receive a second alignment horn attached to a second radiating element; a third horn receptacle configured to receive a third alignment horn attached to a third radiating element; and a fourth horn receptacle configured to receive a fourth alignment horn attached to a fourth radiating element.

Example 15 is an antenna array as in any of Examples 1-14, further comprising a dielectric insert that comprises: a stud comprising a stud thickness; and a horn receptacle forming a hole disposed through the stud thickness.

Example 16 is an antenna array as in any of Examples 1-15, wherein the horn receptacle of the dielectric insert is configured to receive the alignment horn to aid in maintaining positioning of the radiating element; wherein at least a portion of the horn receptacle comprises a conical frustum geometry; and wherein the alignment horn further comprises a shaft configured to be disposed within the horn receptacle.

Example 17 is an antenna array as in any of Examples 1-16, wherein the shaft of the alignment horn comprises a conical frustum geometry comprising a narrow end having a relatively smaller diameter and a wide end having a relatively larger diameter; wherein the conical frustum geometry of the horn receptacle comprises a narrow end having a relatively smaller diameter and a wide end having a relatively larger diameter; wherein the alignment horn is disposed within the horn receptacle such that the narrow end of the alignment horn forms a compression fit against the narrow end of the horn receptacle; and wherein the alignment horn is disposed within the horn receptacle such that the wide end of the alignment horn forms a compression fit against the wide end of the horn receptacle.

Example 18 is an antenna array as in any of Examples 1-17, wherein the detent end of the alignment horn is configured to be pressed through the horn receptacle and disposed on a distal surface of the stud, and wherein the distal surface of the stud is a side farthest from the radiating element of the antenna array.

Example 19 is an antenna array as in any of Examples 1-18, wherein the dielectric insert further comprises a plug attached to the stud; wherein the plug is disposed adjacent to the horn receptacle; and wherein the plug is configured to maintain positioning of the radiating element.

Example 20 is an antenna array as in any of Examples 1-19, wherein the plug comprises four sides disposed substantially perpendicular to a planar surface of the stud; wherein each of the four sides comprises a chamfered edge; and wherein a dimension of each of the four sides is optimized for maintaining positioning of four radiating elements arranged in an orthogonal pair arrangement.

Example 21 is a system. The system includes a coaxial pin in electromagnetic communication with an antenna array. The system includes a dielectric insert configured to provide positional support for the coaxial pin, wherein the dielectric insert comprises: a shaft comprising a central hollow space defined by a wall; and a plurality of fins attached to the shaft. The system is such that the dielectric insert forms an interference fit with one or more of the coaxial pin or the antenna array.

Example 22 is a system as in Example 21, wherein the wall of the shaft comprises one or more of a hollow cylindrical geometry or a hollow conical frustum geometry, and wherein an inner diameter of the wall is optimized for receiving the coaxial pin.

Example 23 is a system as in any of Examples 21-22, wherein the coaxial pin comprises a substantially cylindrical geometry; and wherein the coaxial pin comprises one or more nubs attached to an outer wall of the substantially cylindrical geometry that protrude outward relative to the outer wall.

Example 24 is a system as in any of Examples 21-23, wherein a protuberance of the one or more nubs is optimized to form the interference fit between the dielectric insert and the coaxial pin.

Example 25 is a system as in any of Examples 21-24, further comprising a spring pin configured to be disposed around at least a portion of the coaxial pin, wherein the spring pin enables the coaxial pin to maintain electromagnetic communication with an electrically conductive pad of a circuit board.

Example 26 is a system as in any of Examples 21-25, wherein the interference fit between the dielectric insert and the coaxial pin comprises a direct interference fit between the dielectric insert and an outer wall of the spring pin.

Example 27 is a system as in any of Examples 21-26, wherein the wall of the shaft comprises one or more of a hollow cylindrical geometry or a hollow conical frustum geometry; and wherein a diameter of the central hollow space defined by the wall is optimized for forming the interference fit between the coaxial pin and the dielectric insert.

Example 28 is a system as in any of Examples 21-27, wherein the antenna array comprises one or more nubs attached to a metal component of the antenna array that protrude from a surface of the metal component; and wherein a protuberance of the one or more nubs of the antenna array is optimized to form the interference fit between the dielectric insert and the antenna array.

Example 29 is a system as in any of Examples 21-28, wherein the interference fit between the dielectric insert and the antenna array is formed where a sidewall of at least one of the plurality of fins touches at least one of the one or more nubs attached to the metal component of the antenna array.

Example 30 is a system as in any of Examples 21-29, wherein the antenna array is manufactured using metal additive manufacturing techniques; and wherein the one or more nubs of the antenna array is printed on to the metal component using the metal additive manufacturing techniques such that the antenna array and the one or more nubs of the antenna array form a single metal element.

Example 31 is a system as in any of Examples 21-30, wherein the single metal element further comprises the coaxial pin such that each of the coaxial pin, the antenna array, and the one or more nubs of the antenna array is manufactured using the metal additive manufacturing techniques such that manufacturing the single metal element does not require a separate joining process for joining separate components.

Example 32 is a system as in any of Examples 21-31, wherein the coaxial pin further comprises one or more nubs attached to a surface of the coaxial pin that protrude outward relative to an outer surface of the coaxial pin; and wherein the single metal element further comprises the one or more nubs of the coaxial pin.

Example 33 is a system as in any of Examples 21-32, wherein the dielectric insert is manufactured of a dielectric material, and wherein each of the coaxial pin and the antenna array is manufactured of an electrically conductive material.

Example 34 is a system as in any of Examples 21-33, wherein at least one of the plurality of fins comprises a chamfered edge.

Example 35 is a system as in any of Examples 21-34, wherein the wall of the shaft comprises one or more of a hollow cylindrical geometry or a hollow conical frustum geometry; and wherein each of the plurality of fins extends radially outward relative from the wall of the shaft.

Example 36 is a system as in any of Examples 21-35, wherein the dielectric insert comprises three or more fins attached to the shaft; and wherein each of the three or more fins forms an interference fit with one or more components of the antenna array that is disposed around the coaxial pin.

Example 37 is a system as in any of Examples 21-36, wherein the dielectric insert is disposed within the antenna array such that a negative airspace is formed between the dielectric insert and the one or more components of the antenna array that is disposed around the coaxial pin.

Example 38 is a system as in any of Examples 21-37, wherein the coaxial pin is manufactured as a component of the antenna array utilizing metal additive manufacturing techniques; wherein the dielectric insert is manufacturing utilizing injection molding techniques with a dielectric material; wherein the antenna array comprising the coaxial pin is manufactured separately from the dielectric insert; and wherein the dielectric insert is releasably pressed into the antenna array to maintain optimized positioning between the coaxial pin and one or more other components of the antenna array surrounding the coaxial pin.

Example 39 is a system as in any of Examples 21-38, wherein the wall of the shaft comprises a hollow conical frustum geometry; wherein the hollow conical frustum geometry comprises a proximal inner diameter disposed nearer to a point where the coaxial pin is attached to the antenna array; wherein the hollow conical frustum geometry comprises a distal inner diameter disposed farther from the point where the coaxial pin is attached to the antenna array; wherein the proximal inner diameter is greater than the distal inner diameter.

Example 40 is a system as in any of Examples 21-39, wherein the wall of the shaft comprises one or more of a hollow cylindrical geometry or a hollow conical frustum geometry; wherein the wall of the shaft comprises a chamfered edge disposed adjacent to the coaxial pin when the dielectric insert is installed within the antenna array; and wherein the chamfered edge broadens an inner diameter of the shaft to reduce friction between the coaxial pin and the dielectric insert when initially installing the dielectric insert within the antenna array.

Example 41 is an antenna array as in any of Examples 1-20, wherein the shaft of the alignment horn comprises one or more of a conical frustum geometry or a cylindrical geometry, wherein a diameter of the shaft of the alignment horn is smaller than a diameter of the negative space defined by the horn receptacle, and wherein the alignment horn is disposed within the horn receptacle to form a slip fit between the alignment horn and the horn receptacle.

Example 42 is an antenna array as in any of Examples 1-20 and 41, wherein the horn receptacle of the dielectric insert is configured to receive the alignment horn to aid in maintaining positioning of the radiating element; wherein at least a portion of the horn receptacle defines the hole with a cylindrical geometry; wherein at least a portion of the alignment horn comprises a cylindrical geometry; and wherein the alignment horn is disposed within the horn receptacle such that a slip fit is formed between an outer wall of the alignment horn and an inner wall of the horn receptacle.

Example 42 is an antenna array as in any of Examples 1-20 and 41-42, further comprising an adhesive disposed between a surface of the dielectric insert and a surface of the antenna array for adhering the dielectric insert to the antenna array such that the dielectric insert maintains positioning of the radiating element.

Example 43 is a system as in any of Examples 21-40, wherein the antenna array comprises a wall defining a groove, and wherein the groove defines a negative airspace within the antenna array; wherein a dimension of the groove is optimized for receiving one of the plurality of fins of the dielectric insert; and wherein one or more of an interference fit or a slip fit is formed between the wall of the antenna array that defines the groove and an outer wall of the one of the plurality of fins.

Example 44 is a system comprising an antenna array, wherein the antenna array comprises a plurality of radiating elements and a coaxial pin. The system comprises a dielectric insert disposed within the antenna array to maintain positional optimizations between components of the antenna array.

Example 45 is a system as in Example 44, wherein the dielectric insert comprises one or more of a dielectric insert configured to maintain positional optimizations between two or more of the radiating element (such as, for example, any of the dielectric inserts discussed in connection with FIGS. 1-11); or a dielectric insert configured to maintain positional optimizations for the coaxial pin (such as, for example, any of the dielectric inserts discussed in connection with FIGS. 12-16).

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A system comprising:

a coaxial pin in electromagnetic communication with an antenna array, wherein the antenna array comprises one or more nubs attached to a metal component of the antenna array that protrude from a surface of the metal component; and a dielectric insert configured to provide positional support for the coaxial pin, wherein the dielectric insert comprises:

a shaft comprising a central hollow space defined by a wall; and a plurality of fins attached to the shaft;

wherein the dielectric insert forms an interference fit with one or more of the coaxial pin or the antenna array; and wherein a protuberance of the one or more nubs of the antenna array is optimized to form the interference fit between the dielectric insert and the antenna array.

2. The system of claim 1, wherein the wall of the shaft comprises one or more of a hollow cylindrical geometry or a hollow conical frustum geometry, and wherein an inner diameter of the wall is optimized for receiving the coaxial pin.

3. The system of claim 1, wherein the coaxial pin comprises a substantially cylindrical geometry; and wherein the coaxial pin comprises one or more nubs attached to an outer wall of the substantially cylindrical geometry that protrude outward relative to the outer wall.

4. The system of claim 3, wherein a protuberance of the one or more nubs is optimized to form the interference fit between the dielectric insert and the coaxial pin.

5. The system of claim 1, further comprising a spring pin configured to be disposed around at least a portion of the coaxial pin, wherein the spring pin enables the coaxial pin to maintain electromagnetic communication with an electrically conductive pad of a circuit board.

6. The system of claim 5, wherein the wall of the shaft comprises one or more of a hollow cylindrical geometry or a hollow conical frustum geometry; and wherein a diameter of the central hollow space defined by the wall is optimized for forming the interference fit between the coaxial pin and the dielectric insert.

7. The system of claim 1, wherein the interference fit between the dielectric insert and the antenna array is formed where a sidewall of at least one of the plurality of fins touches at least one of the one or more nubs attached to the metal component of the antenna array.

8. The system of claim 1, wherein the antenna array is manufactured using metal additive manufacturing techniques; and wherein the one or more nubs of the antenna array is printed on to the metal component using the metal additive manufacturing techniques such that the antenna array and the one or more nubs of the antenna array form a single metal element.

9. The system of claim 8, wherein the single metal element further comprises the coaxial pin such that each of the coaxial pin, the antenna array, and the one or more nubs of the antenna array is manufactured using the metal additive manufacturing techniques such that manufacturing the single metal element does not require a separate joining process for joining separate components.

10. The system of claim 9, wherein the coaxial pin further comprises one or more nubs attached to a surface of the coaxial pin that protrude outward relative to an outer surface of the coaxial pin; and wherein the single metal element further comprises the one or more nubs of the coaxial pin.

11. The system of claim 1, wherein the dielectric insert is manufactured of a dielectric material, and wherein each of the coaxial pin and the antenna array is manufactured of an electrically conductive material.

12. The system of claim 1, wherein at least one of the plurality of fins comprises a chamfered edge.

13. The system of claim 1, wherein the wall of the shaft comprises one or more of a hollow cylindrical geometry or a hollow conical frustum geometry; and wherein each of the plurality of fins extends radially outward relative from the wall of the shaft.

14. The system of claim 13, wherein the dielectric insert comprises three or more fins attached to the shaft; and wherein each of the three or more fins forms an interference fit with one or more components of the antenna array that is disposed around the coaxial pin.

15. The system of claim 14, wherein the dielectric insert is disposed within the antenna array such that a negative airspace is formed between the dielectric insert and the one or more components of the antenna array that is disposed around the coaxial pin.

16. The system of claim 1, wherein the coaxial pin is manufactured as a component of the antenna array utilizing metal additive manufacturing techniques;

wherein the dielectric insert is manufactured utilizing injection molding techniques with a dielectric material;

wherein the antenna array comprising the coaxial pin is manufactured separately from the dielectric insert; and wherein the dielectric insert is releasably pressed into the antenna array to maintain optimized positioning between the coaxial pin and one or more other components of the antenna array surrounding the coaxial pin.

17. The system of claim 1, wherein the wall of the shaft comprises a hollow conical frustum geometry;

wherein the hollow conical frustum geometry comprises a proximal inner diameter disposed nearer to a point where the coaxial pin is attached to the antenna array;

wherein the hollow conical frustum geometry comprises a distal inner diameter disposed farther from the point where the coaxial pin is attached to the antenna array;

wherein the proximal inner diameter is greater than the distal inner diameter.

18. The system of claim 1, wherein the wall of the shaft comprises one or more of a hollow cylindrical geometry or a hollow conical frustum geometry;

wherein the wall of the shaft comprises a chamfered edge that broadens an inner diameter of the shaft to reduce friction between the coaxial pin and the dielectric insert when initially installing the dielectric insert within the antenna array.

19. The system of claim 1, wherein the antenna array comprises a conductive element, and wherein one or more of an interference fit or a slip fit is formed between the conductive element of the antenna array and an outer wall of the one of the plurality of fins.

* * * * *